US008346468B2

(12) United States Patent
Emanuel et al.

(10) Patent No.: US 8,346,468 B2
(45) Date of Patent: Jan. 1, 2013

(54) METHOD AND APPARATUS FOR COLLISION AVOIDANCE

(75) Inventors: David C. Emanuel, Newark, DE (US); Robert S. Kunzig, Aston, PA (US); Robert M. Taylor, Newark, DE (US)

(73) Assignee: Sky-Trax Incorporated, New Castle, DE (US)

( * ) Notice: Subject to any disclaimer, the term of this patent is extended or adjusted under 35 U.S.C. 154(b) by 457 days.

(21) Appl. No.: 12/459,728

(22) Filed: Jul. 7, 2009

(65) Prior Publication Data

US 2011/0093134 A1 Apr. 21, 2011

Related U.S. Application Data

(60) Provisional application No. 61/134,190, filed on Jul. 8, 2008.

(51) Int. Cl.
*G06F 17/10* (2006.01)
*G08G 1/16* (2006.01)

(52) U.S. Cl. ........ 701/301; 701/117; 701/119; 235/462; 340/901

(58) Field of Classification Search .............. 701/23, 701/301, 41, 117, 119; 342/71; 235/462; 340/901
See application file for complete search history.

(56) References Cited

U.S. PATENT DOCUMENTS

| 4,684,247 A | 8/1987 | Hammill, III |
| 4,802,096 A | 1/1989 | Hainsworth et al. |
| 5,343,206 A * | 8/1994 | Ansaldi et al. ............ 342/70 |
| 5,477,461 A | 12/1995 | Waffler et al. |
| 5,617,335 A | 4/1997 | Hashima et al. |
| 5,793,934 A | 8/1998 | Bauer |
| 5,893,043 A | 4/1999 | Moehlenbrink et al. |
| 6,290,188 B1 | 9/2001 | Bassett |
| 6,308,118 B1 | 10/2001 | Holmquist |
| 6,393,362 B1 | 5/2002 | Burns |
| 6,661,449 B1 | 12/2003 | Sogawa |
| 6,873,286 B2 * | 3/2005 | Albero et al. ............ 342/71 |
| 7,031,837 B1 | 4/2006 | Foust |
| 7,286,934 B2 * | 10/2007 | Gaegauf et al. ............ 701/301 |
| 7,493,200 B2 * | 2/2009 | Takahashi et al. ............ 701/41 |
| 7,845,560 B2 | 12/2010 | Emanuel et al. |

(Continued)

FOREIGN PATENT DOCUMENTS

| EP | 0367526 | 5/1990 |
| EP | 1437636 | 7/2004 |
| JP | 2003-092160 | * 3/2003 |
| WO | PCT/EP02/03329 | * 3/2002 |

OTHER PUBLICATIONS

Developing an AGV motion controller using simulation, emulation and prototyping; Duinkerken, M.B.; Nuttall, A.; Ottjes, J.A.; Lodewijks, G.; Intelligent Vehicles Symposium, 2005. Proceedings. IEEE; Digital Object Identifier: 10.1109/IVS.2005.1505135 Publication Year: 2005 , pp. 394-399.*

(Continued)

*Primary Examiner* — Cuong H Nguyen
(74) *Attorney, Agent, or Firm* — Pepper Hamilton LLP

(57) ABSTRACT

A method and apparatus for avoiding collisions of moving vehicles in an environment that utilizes a position and rotational orientation system to track vehicle locations within a preconfigured operational zone, the method comprising using position tracking data to calculate a predicted trajectory and safety zone of each vehicle for a predetermined prediction time period and determining potential areas of intersection with vehicles to predict collisions.

10 Claims, 21 Drawing Sheets

U.S. PATENT DOCUMENTS

| | | | |
|---|---|---|---|
| 8,103,438 B2* | 1/2012 | Petrie et al. | 701/119 |
| 2003/0034396 A1 | 2/2003 | Tsikos et al. | |
| 2003/0094495 A1 | 5/2003 | Knowles et al. | |
| 2003/0208297 A1 | 11/2003 | Stawikowski et al. | |
| 2004/0016077 A1 | 1/2004 | Song et al. | |
| 2004/0155811 A1* | 8/2004 | Albero et al. | 342/70 |
| 2004/0193351 A1* | 9/2004 | Takahashi et al. | 701/70 |
| 2005/0046584 A1 | 3/2005 | Breed | |
| 2005/0090981 A1* | 4/2005 | Gaegauf et al. | 701/301 |
| 2006/0022872 A1 | 2/2006 | Zimmerman | |
| 2006/0184013 A1 | 8/2006 | Emanuel et al. | |
| 2007/0027585 A1 | 2/2007 | Wulff | |
| 2007/0219720 A1 | 9/2007 | Trepagnier et al. | |
| 2008/0114530 A1* | 5/2008 | Petrisor et al. | 701/117 |
| 2008/0208408 A1* | 8/2008 | Arbitmann et al. | 701/41 |
| 2009/0082949 A1* | 3/2009 | Petrie et al. | 701/119 |
| 2009/0222166 A1* | 9/2009 | Arbitmann et al. | 701/41 |
| 2011/0093134 A1* | 4/2011 | Emanuel et al. | 701/2 |
| 2011/0106361 A1* | 5/2011 | Staempfle et al. | 701/23 |
| 2011/0295496 A1* | 12/2011 | Petrie et al. | 701/117 |

OTHER PUBLICATIONS

Integrated headway adaptation with collision avoidance system for intelligent vehicles; Hsin-Han Chiang; Bing-Fei Wu; Tsu-Tian Lee; Jau-Woei Perng; Systems, Man and Cybernetics, 2007. ISIC. IEEE International Conference on; Digital Object Identifier: 10.1109/ICSMC.2007.4414156; Publication Year: 2007 , pp. 3276-3281.*

Collision Avoidance for Vehicle-Following Systems; Gehrig, S.K.; Stein, F.J.; Intelligent Transportation Systems, IEEE Transactions on; vol. 8 , Issue: 2; Digital Object Identifier: 10.1109/TITS.2006. 888594; Publication Year: 2007 , pp. 233-244.*

Range sensor evaluation for use in Cooperative Intersection Collision Avoidance Systems; Fischer, J.; Menon, A.; Gorjestani, A.; Shankwitz, C.; Donath, M.; Vehicular Networking Conference (VNC), 2009 IEEE ; Digital Object Identifier: 10.1109/VNC.2009. 5416389; Publication Year: 2009 , pp. 1-8.*

Intelligent Traffic Control Based on IEEE 802.11 DCF/PCF Mechanisms at Intersections; Chanwoo Park; Jungwoo Lee; Vehicular Technology Conference (VTC Fall), 2011 IEEE; Digital Object Identifier: 10.1109/VETECF.2011.6093043 Publication Year: 2011 , pp. 1-4.*

An Efficient Computational Architecture for a Collision Early-Warning System for Vehicles, Pedestrians, and Bicyclists; Greene, D.; Juan Liu; Reich, J.; Hirokawa, Y.; Shinagawa, A.; Ito, H.; Mikami, T.; Intelligent Transportation Sys., IEEE Trans. on vol. 12 , Issue: 4; Digital Object Id: 10.1109/TITS.2010.2097594; Pub.Year: 2011, pp. 942-953.*

International Search Report dated Oct. 14, 2011.
International Search Report dated Nov. 6, 2006.

* cited by examiner

METHOD AND APPARATUS FOR COLLISION AVOIDANCE

RELATED APPLICATION

Benefit of U.S. Provisional Application 61/134,190, filed Jul. 8, 2008, is claimed.

PCT/US2005/043755, published as WO2006/065563, Method and Apparatus for Determining Position and Rotational Orientation of an Object.

BACKGROUND OF THE INVENTION

The invention presents a method and apparatus for avoiding collisions of moving vehicles in an environment, such as a warehouse, that utilizes a positioning system to track vehicle locations within a preconfigured operational zone. Automatically guided vehicles (AGVs) typically follow known paths (such as defined by a guidance wire embedded in the floor) in an operating environment and are controlled by an AGV server so that they do not collide with each other. However, when an operating environment utilizes both AGVs and manned vehicles, such as free roaming forklift trucks, the potential for collisions is exacerbated, since the AGV control system has no knowledge of the location, movement direction, or speed of the manned vehicles. The related application, WO2006/065563, facilitates the tracking of both the position and rotational orientation of manned vehicles. Manned vehicles equipped with the position and rotational orientation (PRO) system are referred to as "PRO equipped vehicles" or simply PROVs.

The problem of predicting possible collisions between unmanned vehicles such as automatically guided vehicles (AGV's) and manned vehicles (PROVs) such as free roaming forklift trucks and other mobile industrial equipment is addressed by the method and apparatus of the present invention.

BRIEF SUMMARY OF THE INVENTION

A method and apparatus for avoiding collisions of moving vehicles in an environment that utilizes a position and rotational orientation system to track vehicle locations within a preconfigured operational zone, comprising using position tracking data to calculate a predicted trajectory and safety zone (also called a safety bubble) of each vehicle for a predetermined prediction time period and determining potential areas of intersection with vehicles.

The method for avoiding collisions between manned vehicles and other manned vehicles or between manned vehicles and automatically guided vehicles within a defined operational environment comprises:

a) receiving information on the position of each vehicle within the defined environment at predetermined time intervals;

b) determining a predicted trajectory and safety zone for each vehicle by calculating the velocity and direction of travel of each vehicle from position information at successive time intervals;

c) determining any areas of intersection of a manned vehicle with other manned or unmanned vehicles to predict a potential collision;

d) transmitting instructions to an automatically guided vehicle within an area of intersection to reduce the speed or to stop the automatically guided vehicle to prevent the predicted collision;

e) transmitting a warning to one or more manned vehicles to alert the one or more operators of a predicted potential collision, so that the one or more operators can take appropriate action to avoid the predicted collision.

The steps a) through c) are repeated and if no areas of intersection between a manned and an automatically guided vehicle are subsequently determined:

f) instructions are transmitted to an automatically guided vehicle previously slowed or stopped to resume its previous velocity;

or if no areas of intersection between a manned and another manned vehicle are subsequently determined:

g) a signal is transmitted canceling the alarm to the one or more manned vehicles to alert the one or more operators that no potential collision is predicted.

This system is thus a means of enhancing operations in mixed manned and unmanned vehicle environments.

DETAILED DESCRIPTION OF THE INVENTION

The present invention is a method and apparatus for preventing the collision of vehicles. This method is usable in cooperation with the system of the related application, PCT/US2005/043755 WO2006/065563, incorporated herein by reference, which tracks of vehicles and stored goods within a warehouse or factory setting utilizing a plurality of individually unique position markers, arranged at predetermined known positional locations.

Figure 2:
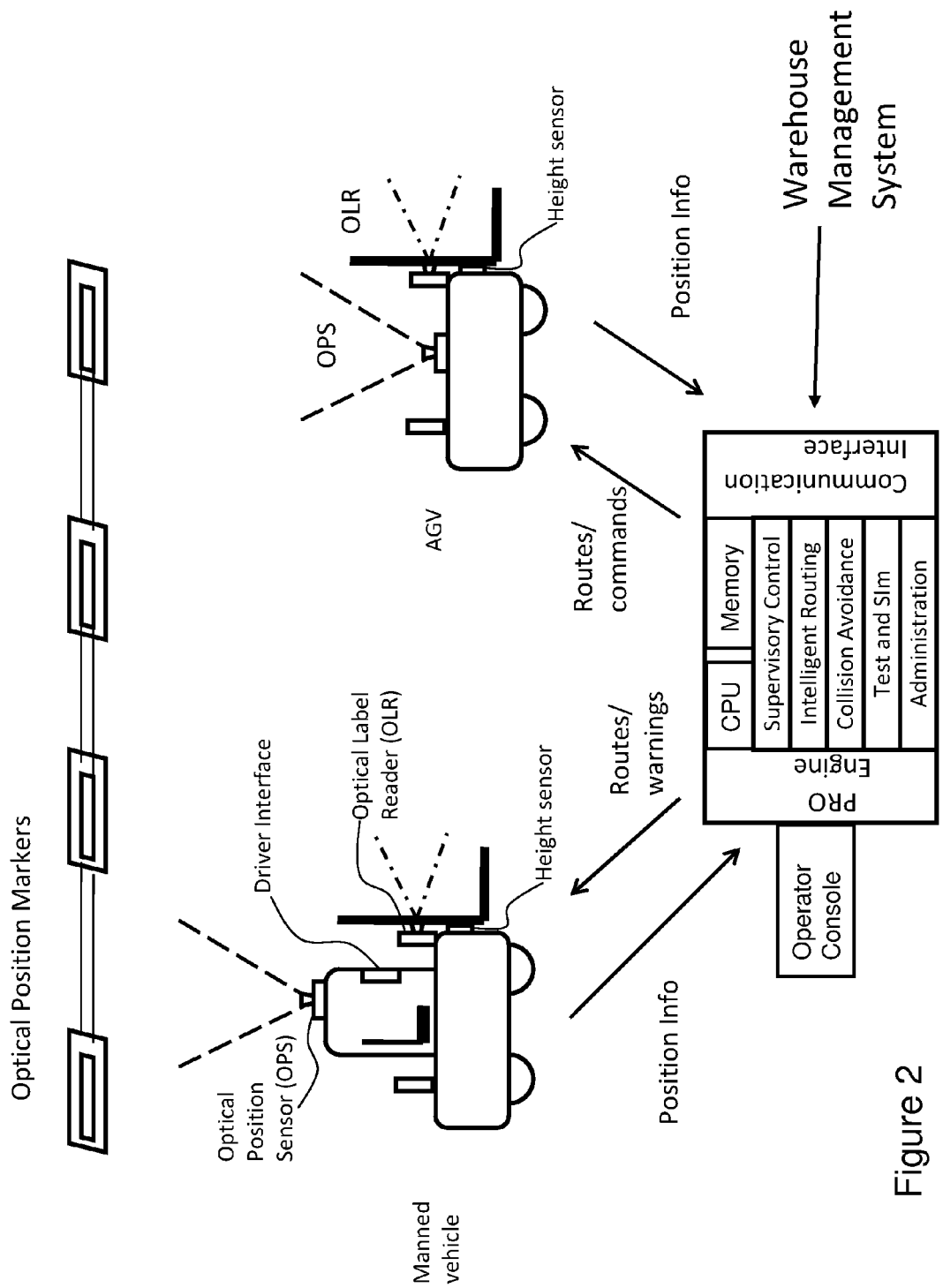
FIG. 2 depicts a warehouse operating environment having both manned and automatically guided vehicles that utilizes the Optical Position and Rotational Orientation system of the related application.

As described in the related application, in a factory or warehouse setting, the position and rotational orientation (PRO) of objects such as manned or unmanned automatically guided vehicles, are located relative to position markers in known locations (FIG. 2).

Each position and rotational orientation (PRO) equipped manned vehicle communicates with a server, termed a PRO-equipped Manned Vehicle Server 2, which tracks the location of the manned vehicle. Automatically guided vehicles (AGVs) move along predetermined paths and are controlled and tracked by an AGV Server 3.

The Collision Avoidance System 10 receives information on the position of each vehicle from the respective server at predetermined time intervals and then determines a predicted trajectory and safety zone for each vehicle by calculating the velocity and direction of travel of each vehicle from position information at successive time intervals.

Based upon the predicted trajectories the system determines any areas of intersection of a manned vehicle with other manned or unmanned vehicles to predict potential collisions. When a collision between a manned vehicle and an un-manned vehicle is predicted, instructions are transmitted to the AGV server and then to an automatically guided vehicle within an area of intersection to either reduce the speed or to stop the automatically guided vehicle to prevent the predicted collision. A message is transmitted to the Manned Vehicle Server and a warning sent to one or more manned vehicles to alert the one or more operators of a predicted potential collision, so that the one or more operators can take appropriate action to avoid the predicted collision.

The Collision Avoidance System (CAS) 10 of the present invention communicates with both the Manned Vehicle Server 2 and the AGV Server 3 and predicts collisions of manned vehicles with either other manned or un-manned vehicles, within the domain of vehicles being monitored by the system. In accordance with the present invention, commands are sent to un-manned vehicles, i.e., automatically guided vehicles (AGVs) to slow or stop them when the system of the present invention determines they are on convergent paths with manned vehicles and warnings are sent to warn operators of manned vehicles.

Figure 1A:
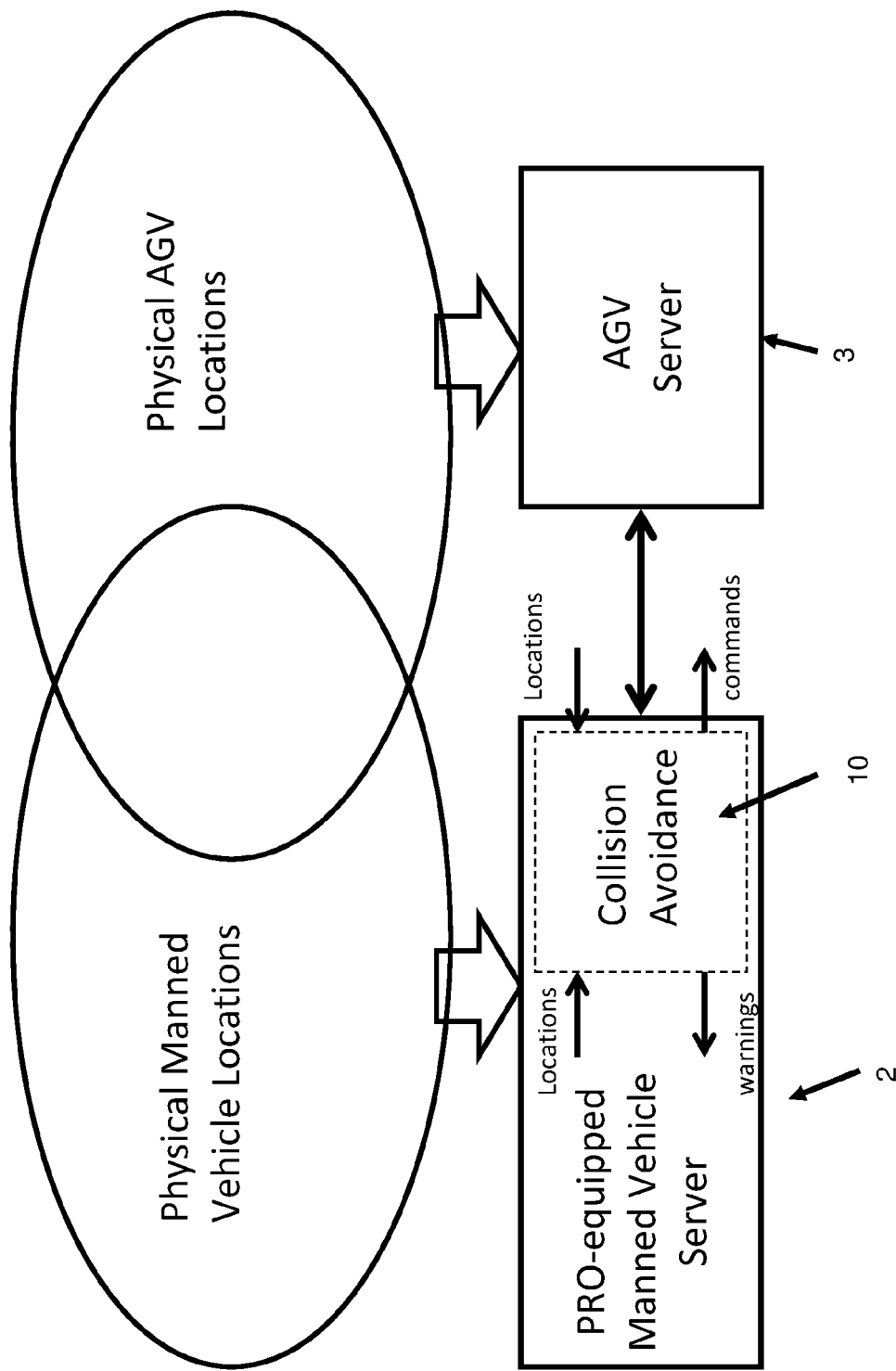
FIG. 1A depicts the collision avoidance system functionally installed within a warehouse having manned and automatically guided vehicles.
Figure 1B:
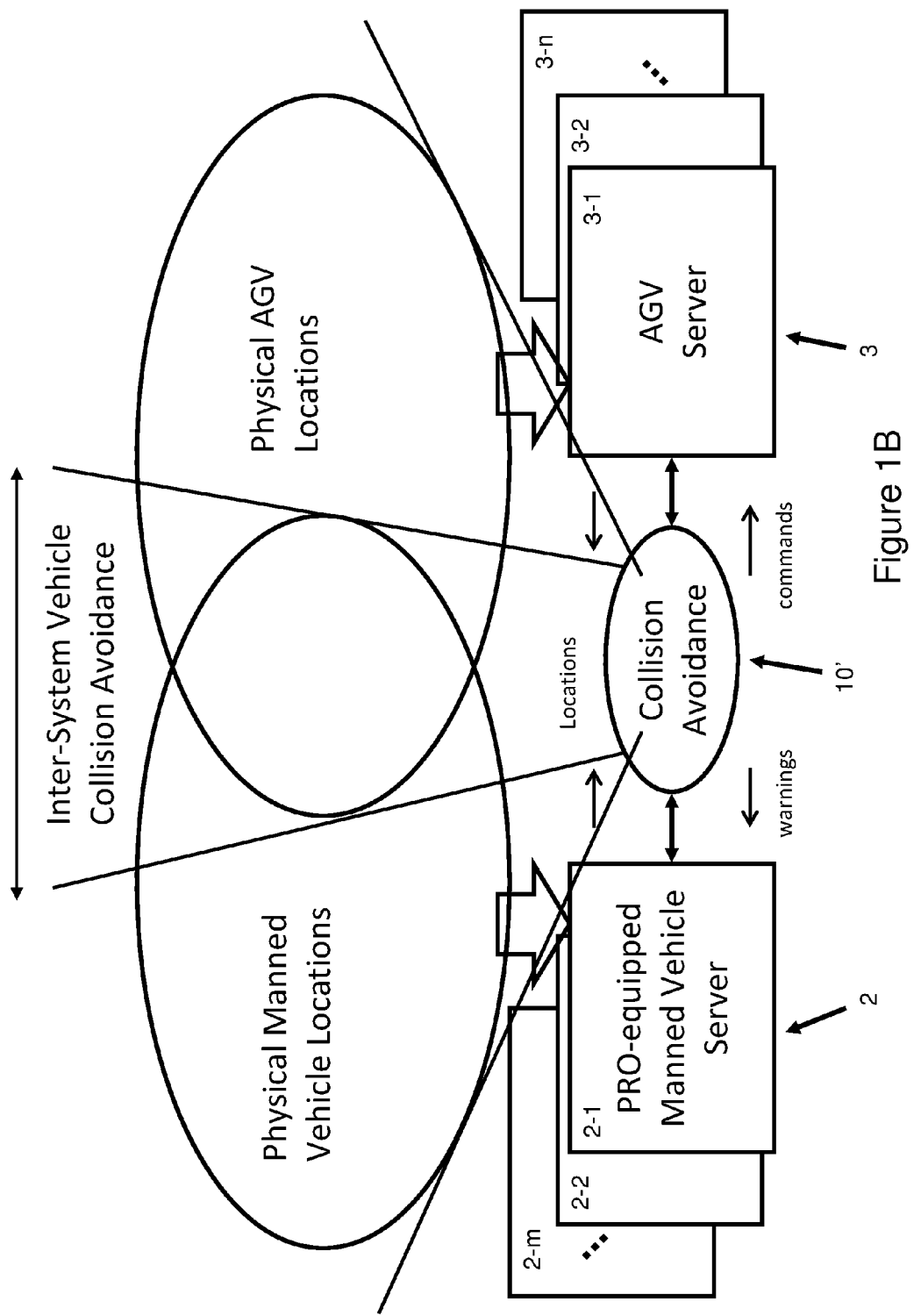
FIG. 1B depicts the CAS system communicating with multiple servers for both the PRO-equipped manned and automatically guided vehicle (AGV) systems.

As shown in FIGS. 1A and 1B the system 10 of the present invention is depicted as a physically separate entity. In FIG. 1A the system 10 is shown housed within the PRO-equipped Manned Vehicle Server 2 and in FIG. 1B the system 10' is shown as a separate physical entity. Alternatively the system 10 could be housed in the AGV server 3 (not shown). The Collision Avoidance System (CAS) 10 of the present invention communicates with both the PRO-equipped Manned Vehicle Server 2 and with the AGV Server 3. FIG. 1A shows a single PRO-equipped Manned Vehicle Server 2 and a single AGV Server 3. The functionality of the system 10 is realized in a computing device controlled by instructions stored within a memory.

This Collision Avoidance System is implemented by software which runs on standard server hardware (such as server 2) and communicates with other computer systems (such as AGV server 3) that map and/or control a collection of vehicles. The system 10 can be deployed in a multiple server environment within a facility that requires large computing capability. FIG. 1B shows an environment where the CAS 10 communicates with multiple PRO-equipped Manned Vehicle Servers 2-1, 2-2, . . . , 2-$m$ and with multiple AGV Servers 3-1, 3-2, . . . , 3-$n$.

To provide the necessary vehicle location information to the CAS 10, manned vehicles are equipped with the Position and Rotational Orientation (PRO) system of the related application. The PRO server(s) 2 determine(s) each vehicle's precise position and sends vehicle IDs and locations to the CAS 10 for mapping and collision prediction. The AGV server(s) 3 also send(s) vehicle IDs and locations to the CAS 10 for mapping and collision prediction.

Figure 8:
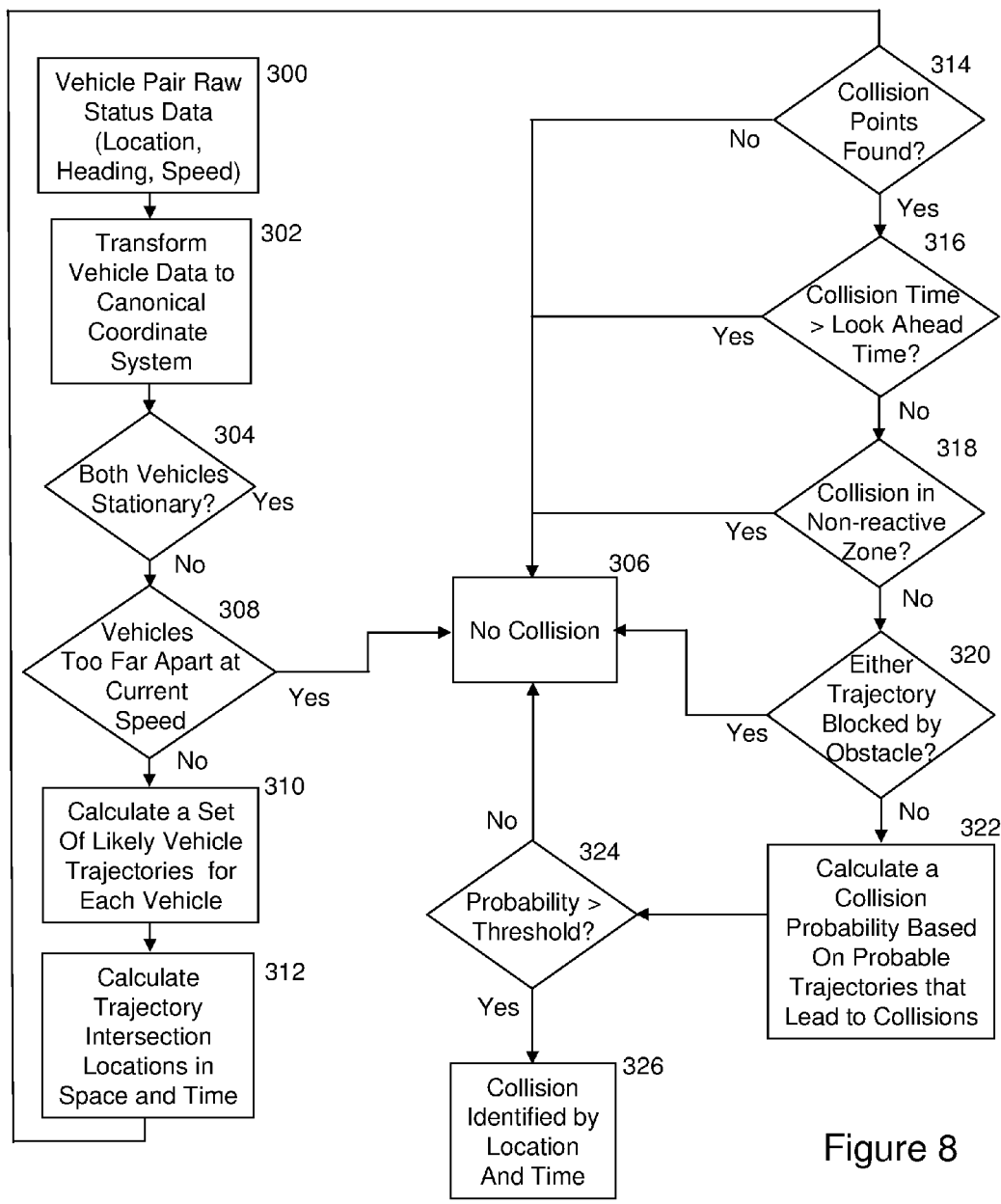
FIG. 8 is a flow chart of a method of predicting possible future collisions.

CAS 10 processes this vehicle information in accordance with the logic shown in FIG. 8. When a collision between a manned and an un-manned vehicle is predicted the system 10 will send a command message to the AGV server 3 stop or reduce the speed of the unmanned vehicle. The messaging will typically be accomplished via electronic communications (for example, the CAS 10 will initiate a connection by connecting to a socket listener in a AGV server 3, such as using the Ethernet protocol). CAS 10 sends a warning message to the PRO server 2 and the PRO server 2 broadcasts the warning to manned vehicles in order to forewarn manned vehicle drivers of impending collisions.

Typical communications between servers utilize a network communication protocol, such as a Ethernet 10/100/1000 Base T. Corresponding IP addresses are configured within each server 2,3 (TCP/IP socket, the port typically used for input/output is 8889). CAS 10 requests that both the PRO server(s) 2 and AGV server(s) 3 transmit vehicle locations for multiple vehicles on a periodic basis to CAS (typically up to about ten times every second). Both the PRO server 2 and the AGV server 3 transmit vehicle locations to the CAS 10. Periodically each server 2,3 communicates with CAS 10 to determine that it is still operational (receives a ACK heartbeat) during location transmissions. If network communications are interrupted for a predetermined period of time alarm messages are transmitted to all manned vehicles alerting the operators.

The CAS 10 will normally interact with other near real time computer systems (such as servers 2,3) and therefore will not have a direct user interface for operation. When implemented as shown in FIG. 1, users may interact with the CAS 10 through the user interface (not shown) of the PRO sever 2 and with the output results that the CAS 10 delivers to the servers 2,3. The CAS system 10 can be deployed in facilities where other prior art collision avoidance devices (not shown) are also deployed, such as reactive bumpers on vehicles, radars, laser scanners, vision systems, etc., which are typically used with automatically guided vehicles. These other collision avoidance devices are inherently vehicle centric, whereas, CAS 10 is a system centric solution. It is not intended that CAS 10 displaces these other devices but that it works in concert with them. The CAS can be used to communicate with these devices through the appropriate server (such as AGV server 3) to provide an overall system of collision avoidance.

Figure 3:
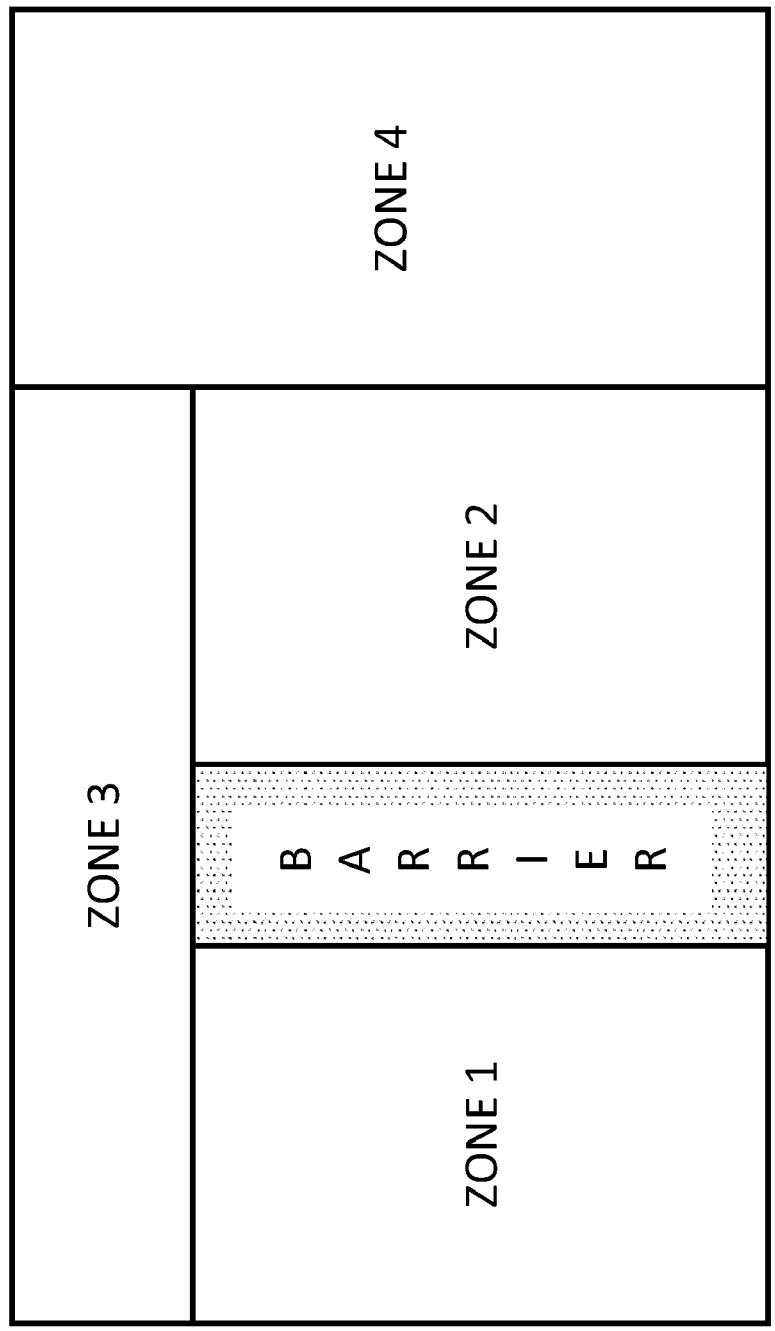
FIG. 3 depicts four vehicle operational zones, adjacent zones that are considered reactive zones, non-adjacent zones that are considered non-reactive zones, and zones separated by a barrier that are non-reactive.

Collision prediction in accordance with the present invention uses the concepts of vehicles residing within zones of a particular facility, as shown in FIG. 3. Zones are considered vehicle operational zones and are either adjacent (such as Zones 1 and 3) or non-adjacent. Zones can be defined as non-reactive to other zones. Non-reactive means that vehicles currently within a zone should not be considered in collision predictions with vehicles that are within zones non-reactive to it. Non-operational or barrier zones can be defined within the facility.

Figure 4:
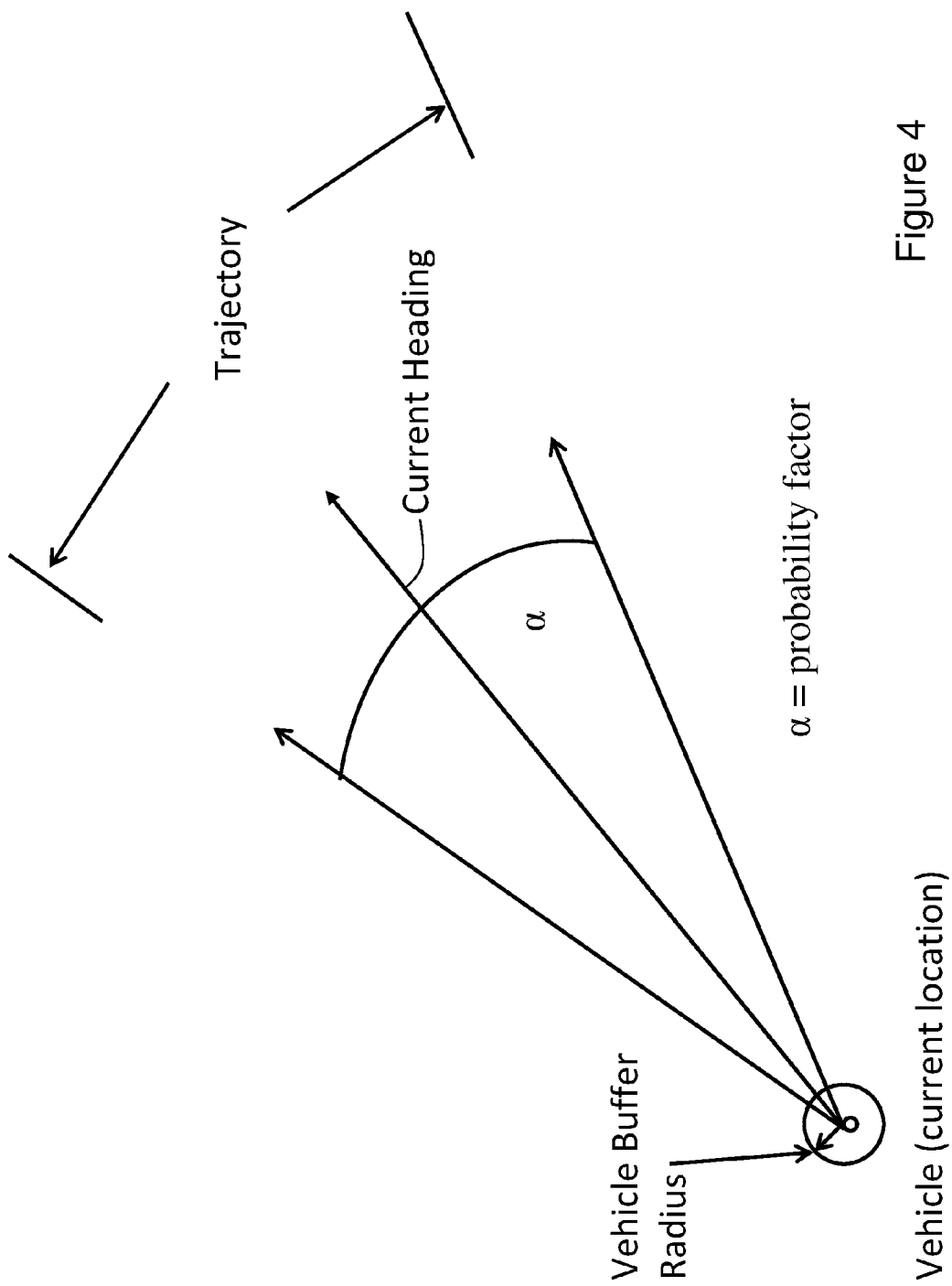
FIG. 4 depicts a vehicle's predicted trajectory and illustrates the Vehicle Buffer Radius.
Figure 5:
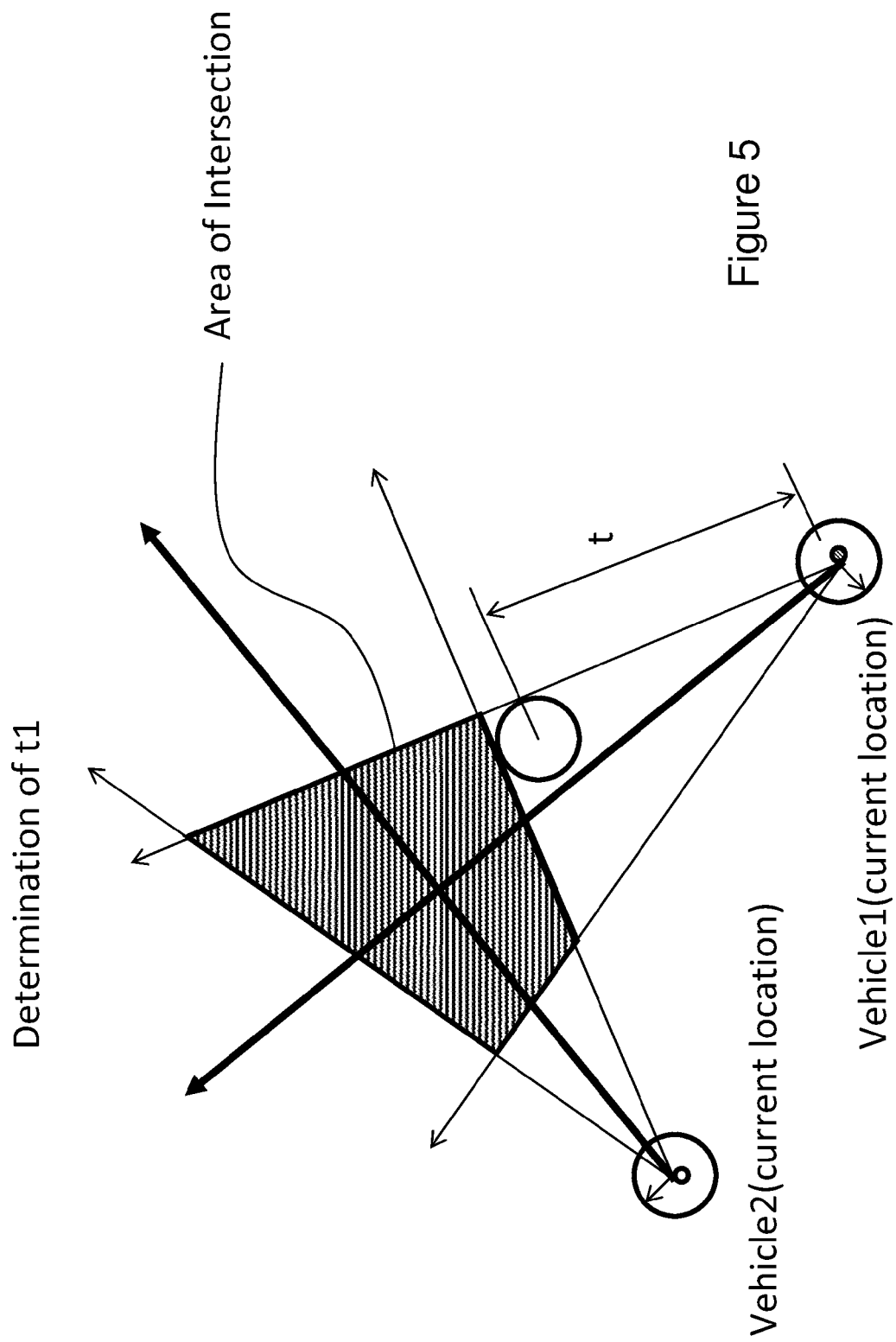
FIG. 5 depicts the area of intersection of trajectories between two non-stationary vehicles.
Figure 6:
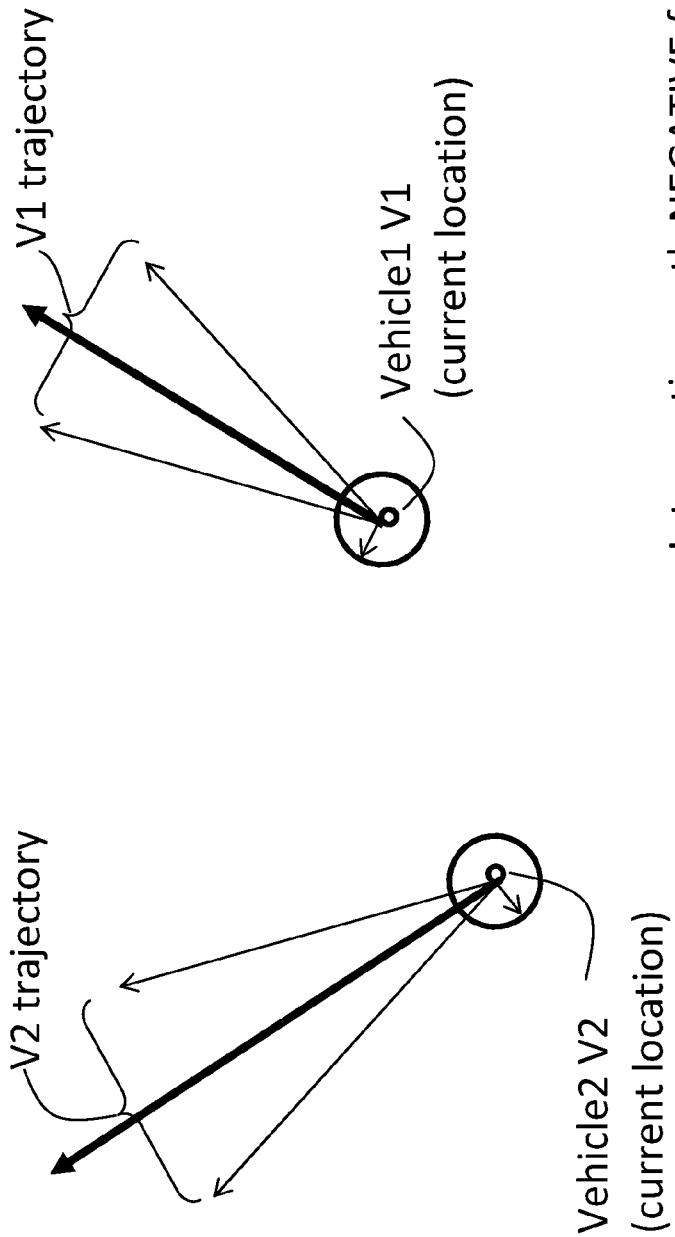
FIG. 6 is depicts two vehicles moving away from each other.
Figure 7:
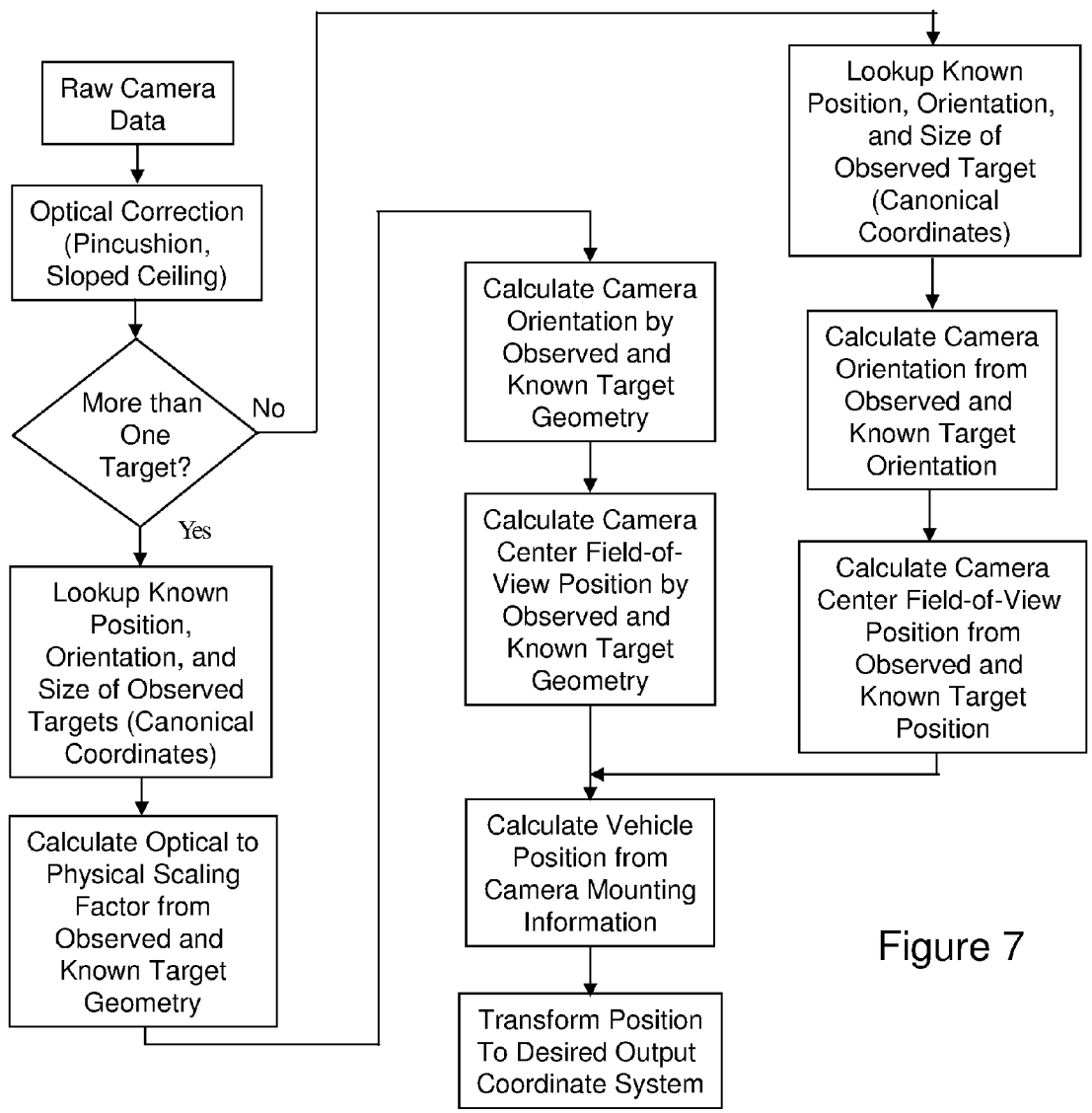
FIG. 7 is a flow chart showing the method for calculating vehicle position from camera data.

As is illustrated in FIG. 4, each vehicle has a current predicted trajectory. The trajectory is a probability vector originating at the vehicle current location with the current heading being the center of the probability vector having a probability factor of $\alpha$. There is a Vehicle Buffer Radius (shown as a circle) for each class of vehicle (such as manned or unmanned) that defines a safety zone of interest around the center of that vehicle. As seen in FIG. 5 there is also a definable Look Ahead Period t1, the time period used for prediction analysis and an Area of Intersection between the trajectories any two non-stationary vehicles V1 and V2. As may be seen in FIG. 6, the Area of Intersection=0 if the vehicles V1. V2 are moving away from each other.

There is a definable collision type that can override whether or not a collision is actually reported if predicted. An example of a collision prediction where the warning may need to be suppressed is one in which two manned vehicles are on parallel paths within the same zone. If one vehicle subsequently changes its direction toward the direction of the other vehicle then a collision would be predicted and the warning given to the operators of the manned vehicles.

A number of examples illustrating different situations of two vehicles are presented in FIGS. 9-20.

Figure 9:
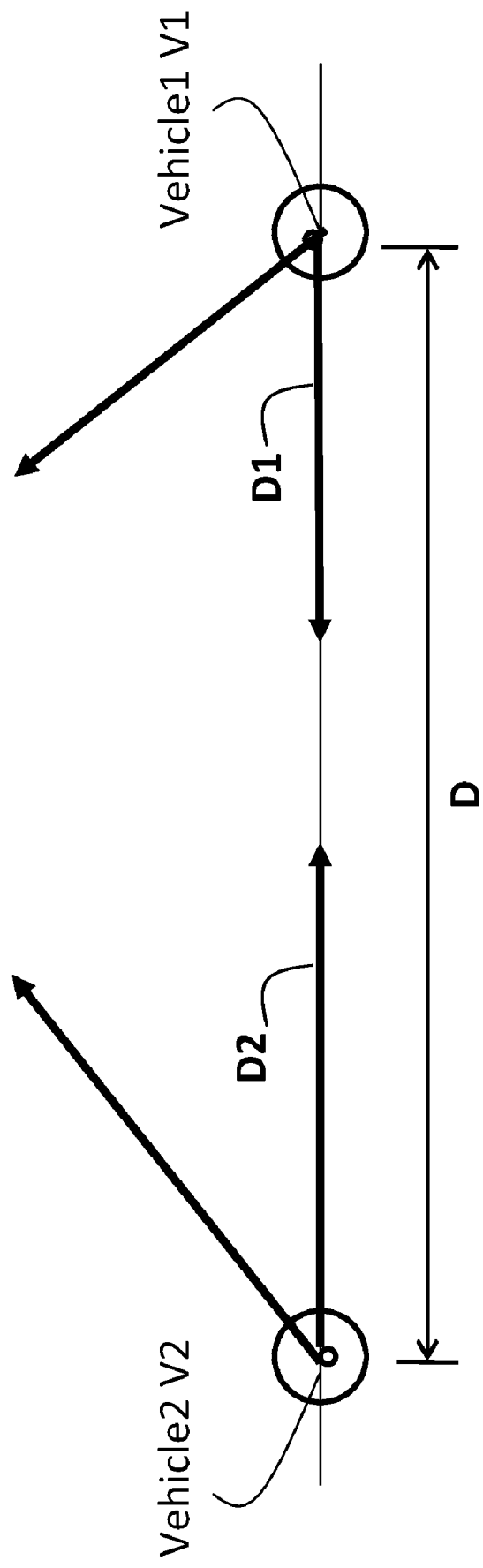
FIG. 9 depicts an example of two vehicles that are farther apart than the sum of the distances that each vehicle can travel during the Look Ahead time period, therefore they are too far apart to collide.

FIG. 9 depicts an example of two vehicles V1, V2 that are farther apart than the sum D of the distances D1, D2 that each vehicle can travel during the Look Ahead time period, therefore they are too far apart to collide (see FIG. 8, blocks 308, 306).

Figure 10:
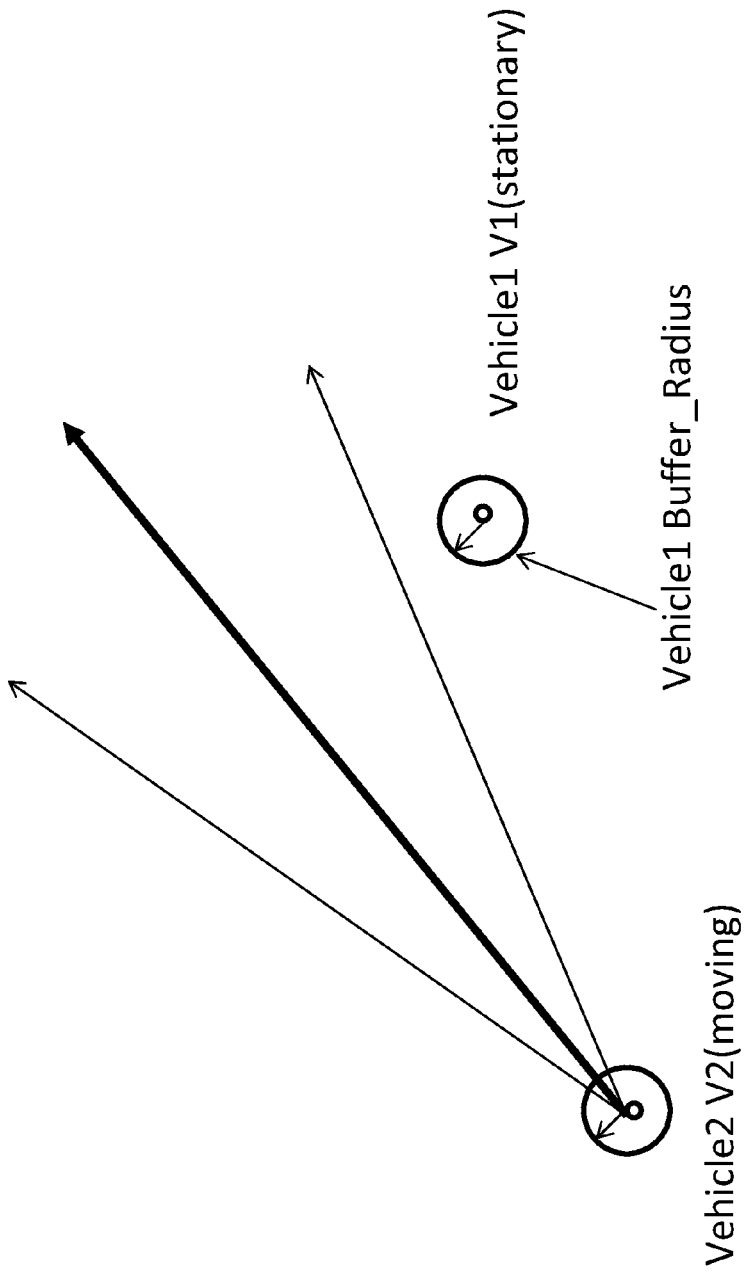
FIG. 10 depicts an example of a moving vehicle that does not pass within the Stationary Buffer Zone of a stationary vehicle.

FIG. 10 depicts an example of a moving vehicle V2 that does not pass within the Stationary Buffer Zone of a stationary vehicle V1 (see FIG. 8, blocks 314, 306).

Figure 11:
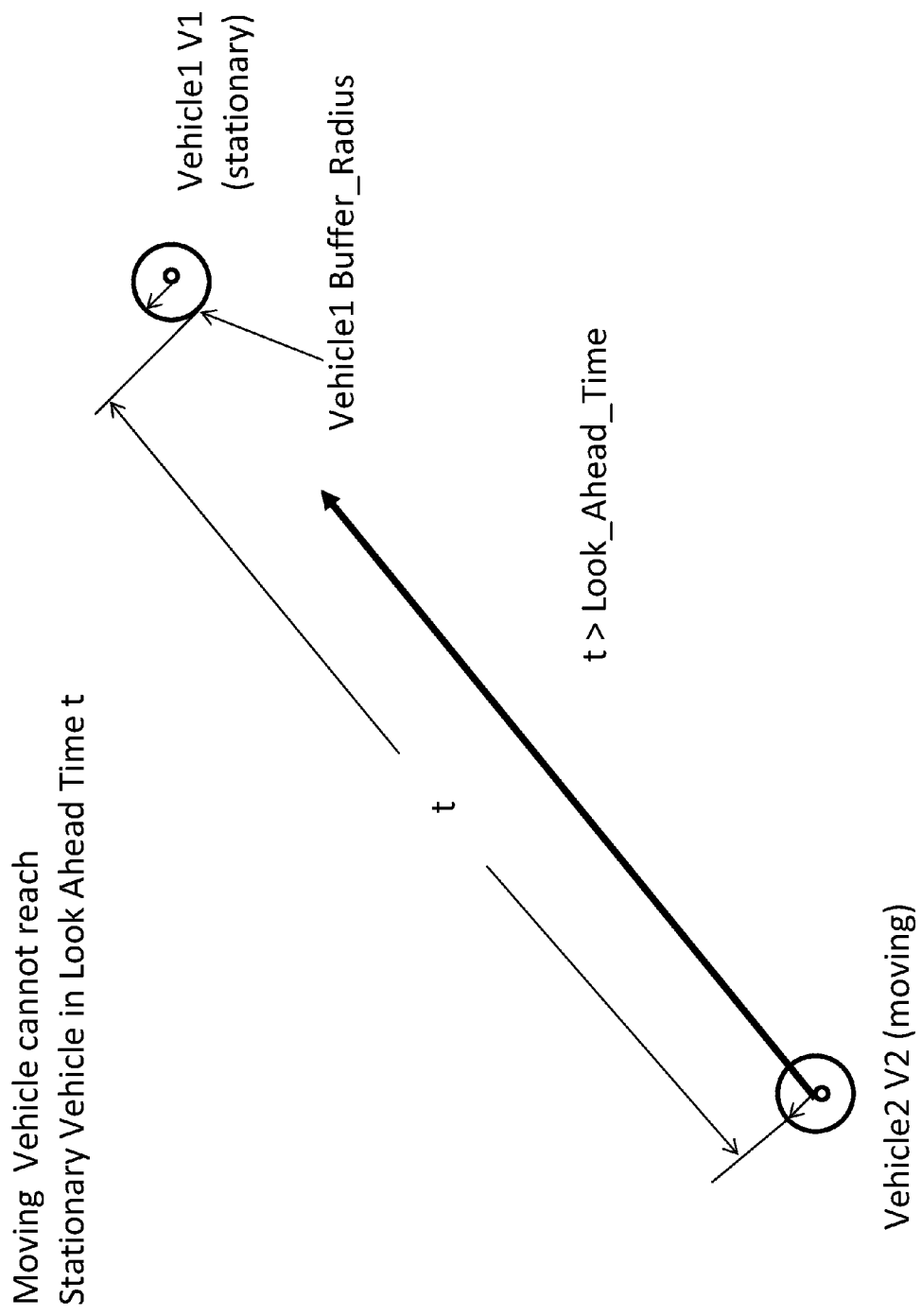
FIG. 11 depicts an example of a moving vehicle that cannot reach the stationary vehicle in Look Ahead Time.

FIG. 11 depicts an example of a moving vehicle V2 moving at a speed such that it cannot reach the stationary vehicle V1 within the Look Ahead Time (FIG. 8, blocks 316, 306).

Figure 12:
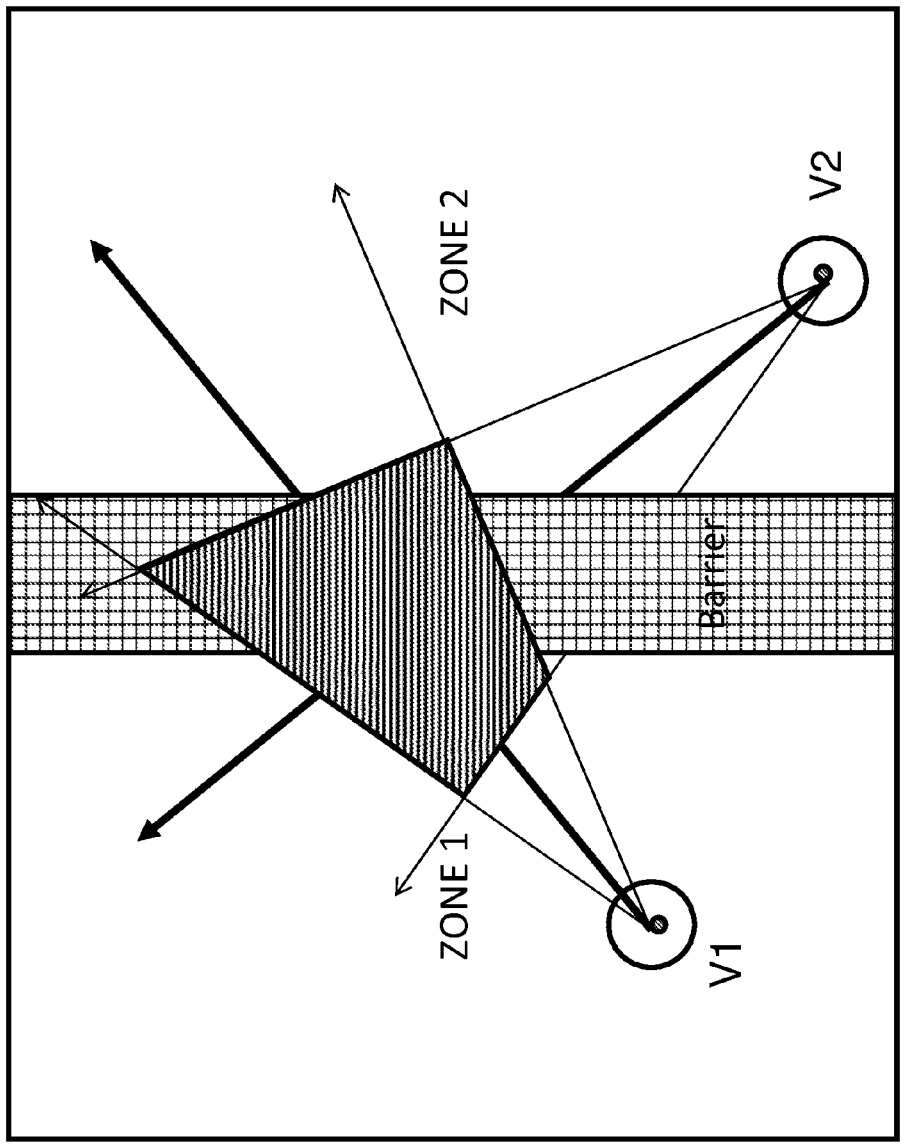
FIGS. 12 and 13 depict examples of the intersection area being in a non-reactive zone to either or both vehicles, in which a negative collision prediction is determined.
Figure 13:
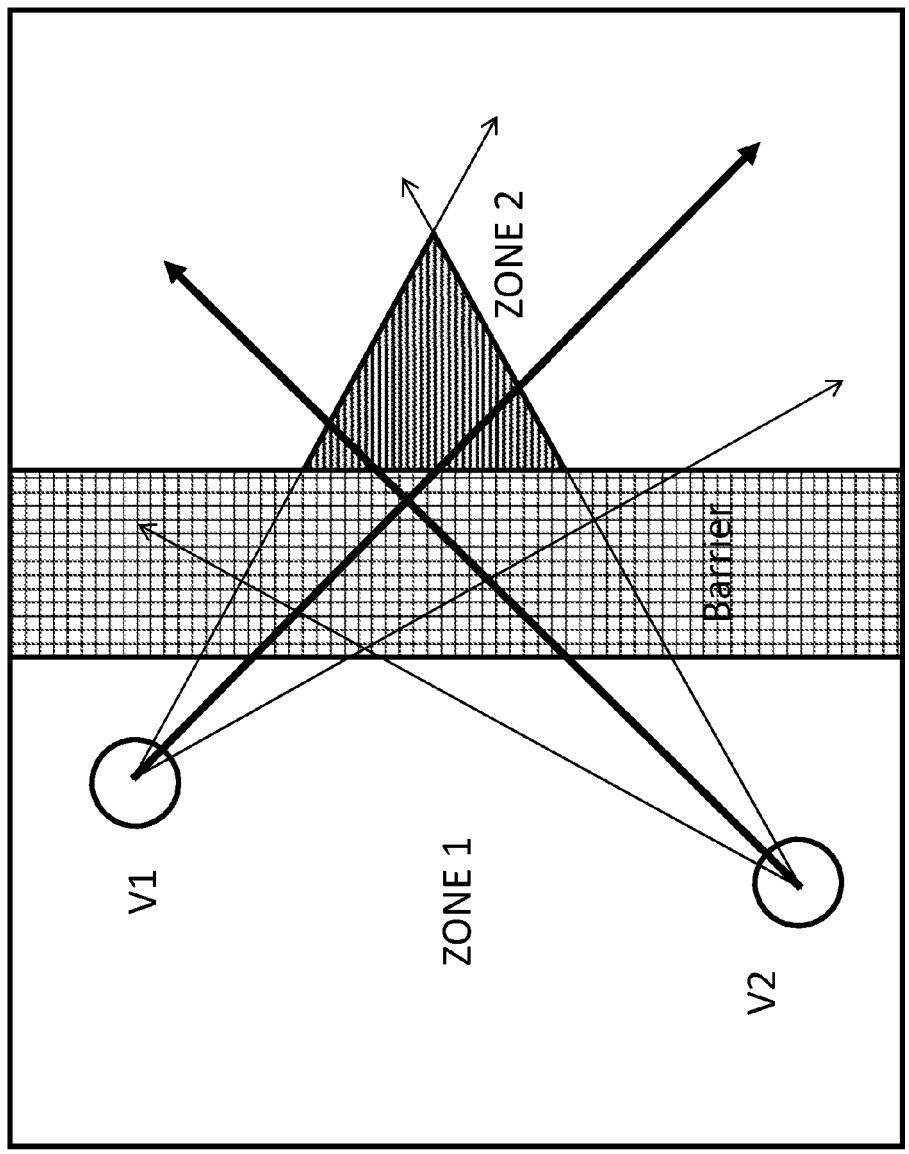

FIGS. 12 and 13 depict examples of the intersection area being in a non-reactive zone to either or both vehicles, in which a negative collision prediction is determined. In FIG. 12 the vehicles V1,V2 are in different zones (Zone 1 and Zone 2 respectively) with a barrier between the zones (see FIG. 8, blocks 320, 306). In FIG. 13 the vehicles V1,V2 are both in the Zone 1 but the area of intersection of their trajectories is in Zone 2, considered non-reactive because of the presence of the Barrier (see FIG. 8, blocks 318, 306).

Figure 14:
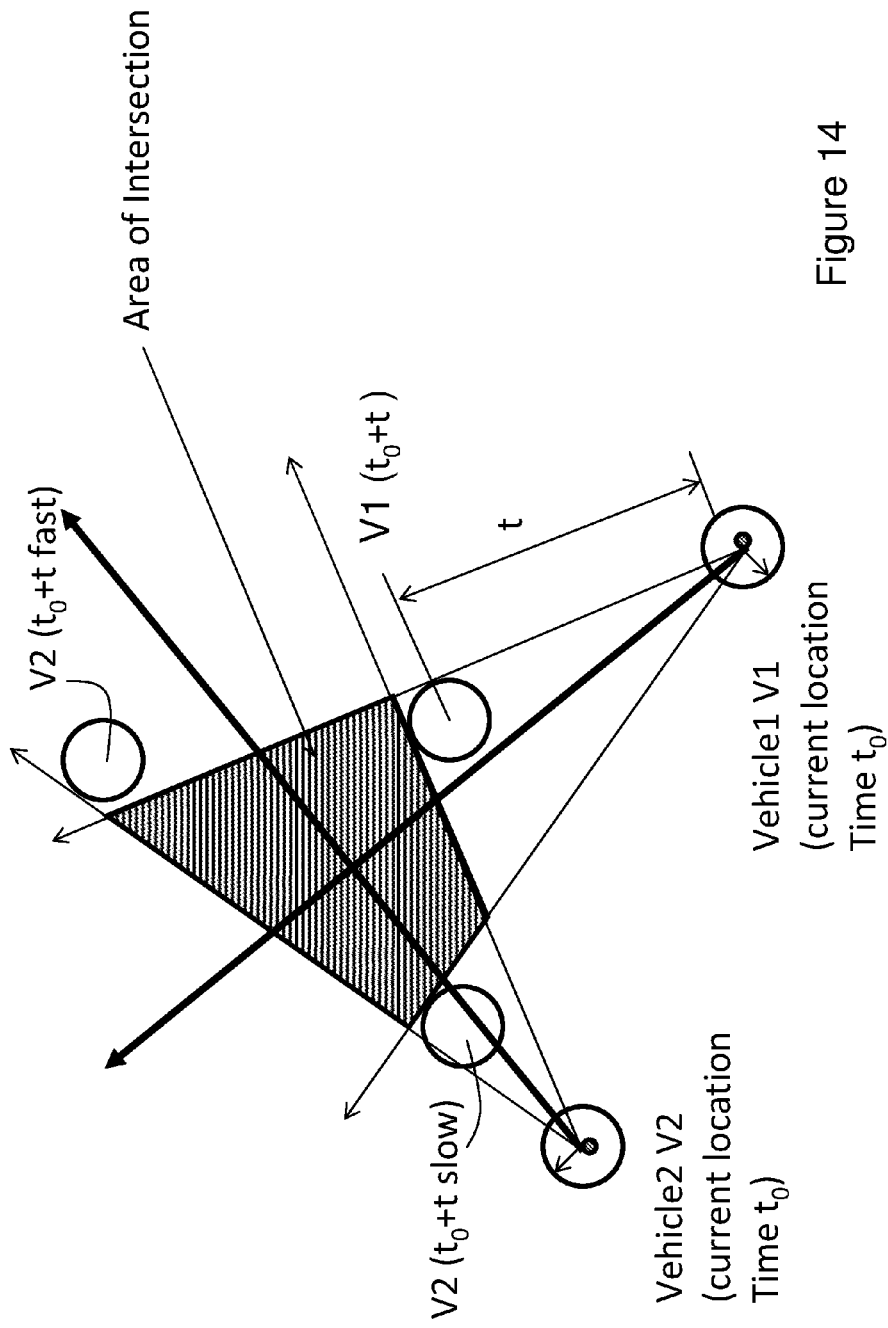
FIG. 14 depict examples of a negative collision prediction wherein vehicle 2 is moving either too slow or too fast to collide with vehicle 1.

FIG. 14 depict examples of a negative collision prediction wherein vehicle V2 is moving either too slow (V2 (slow)) or too fast (V2(fast)) to collide with vehicle 1. At time t1 V2(slow) is outside the area of intersection. At time t1 V2(fast) is outside the area of intersection (see FIG. 8, blocks 314, 306).

Figure 15:
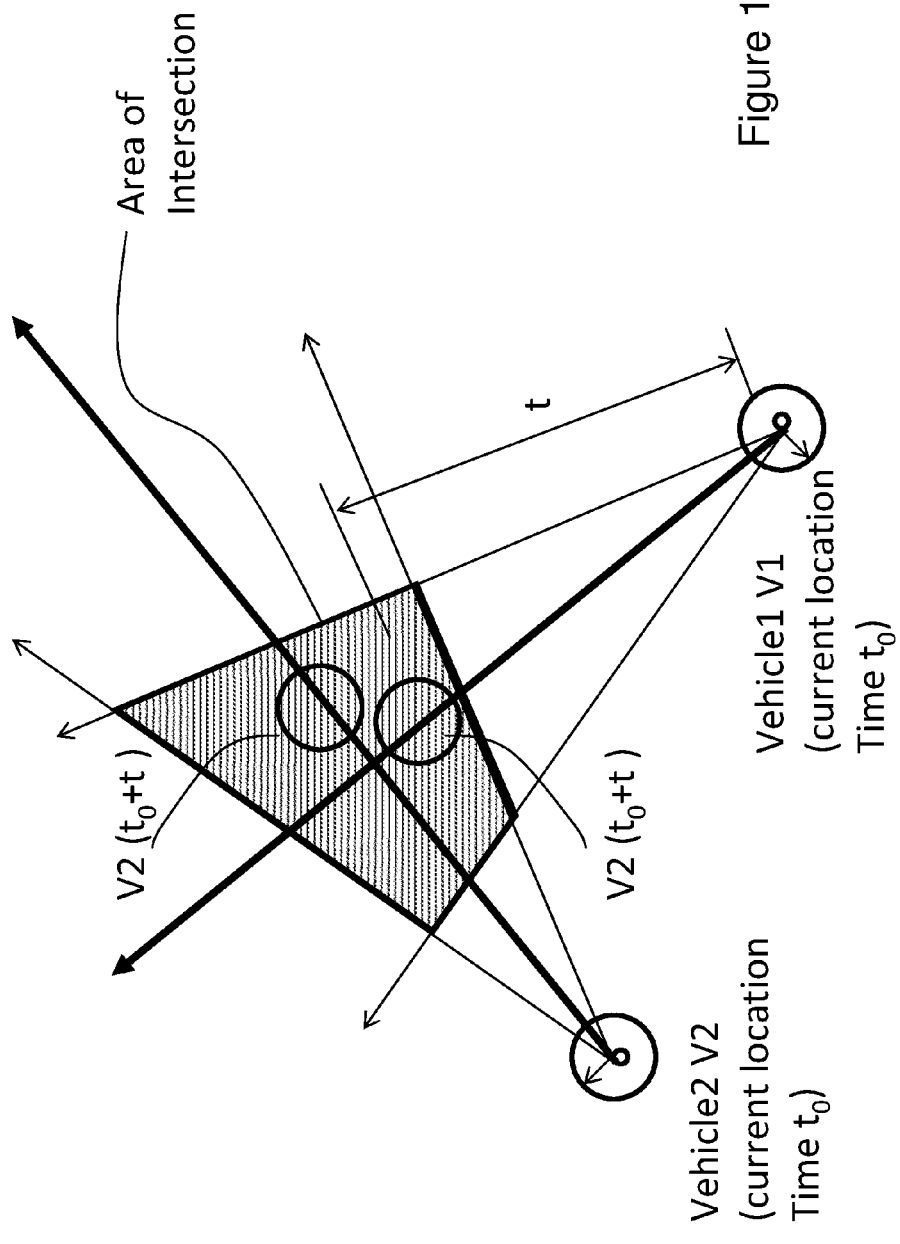
FIG. 15 depicts a positive collision prediction.

FIG. 15 depicts an example of a positive collision prediction. At time t1 both vehicles V1 and V2 are within the area of intersection. Although the buffer zones of each vehicle do not intersect, a positive collision prediction is generated. If vehicle V1 is manned a warning message would be sent by CAS 10 to PRO Manned Vehicle Server 2, which would send a warning to the operator of vehicle V1. If vehicle V2 is an automatically guided vehicle, a command message would be sent by CAS 10 to the AGV server 3 to slow or stop vehicle 2 to prevent a collision.

Figure 16:
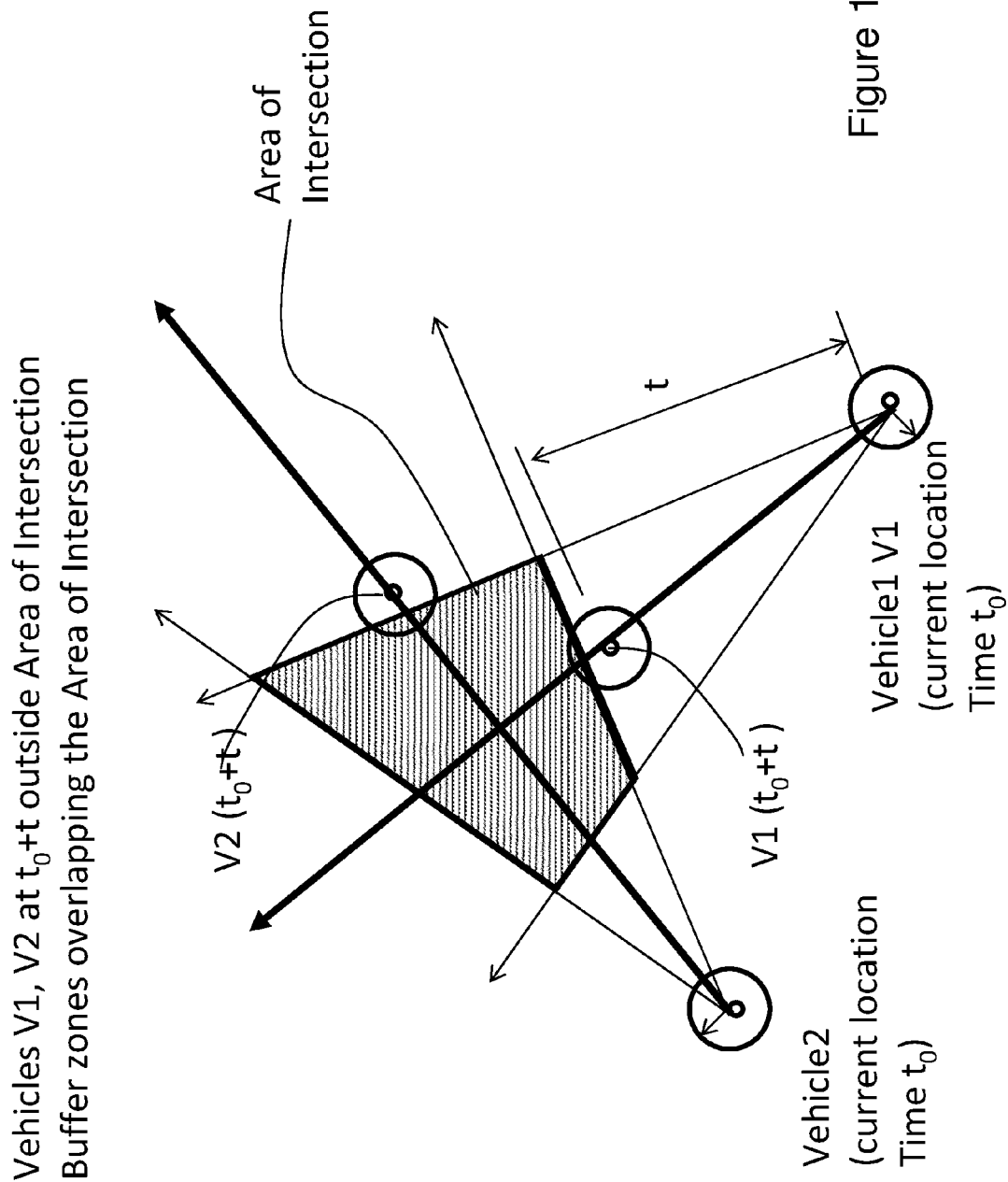
FIG. 16 depicts two vehicles predicted to be outside the area of intersection whose buffer zones overlap the area of intersection.

FIG. 16 shows a situation wherein the predicted positions of vehicles V1, V2 at time t1 are outside the Area of Intersection but the Buffer Zones of vehicles V1, V2 overlap the Area of Intersection. For such a situation the probability of collision is low. If the probability of collision (FIG. 8, block 322) is greater than a predetermined threshold value a positive collision would be predicted (FIG. 8, block 324, 326). If the probability of collision (FIG. 8, block 322) is lower than a predetermined threshold value a negative collision would be predicted (FIG. 8, block 324, 306).

Figure 17:
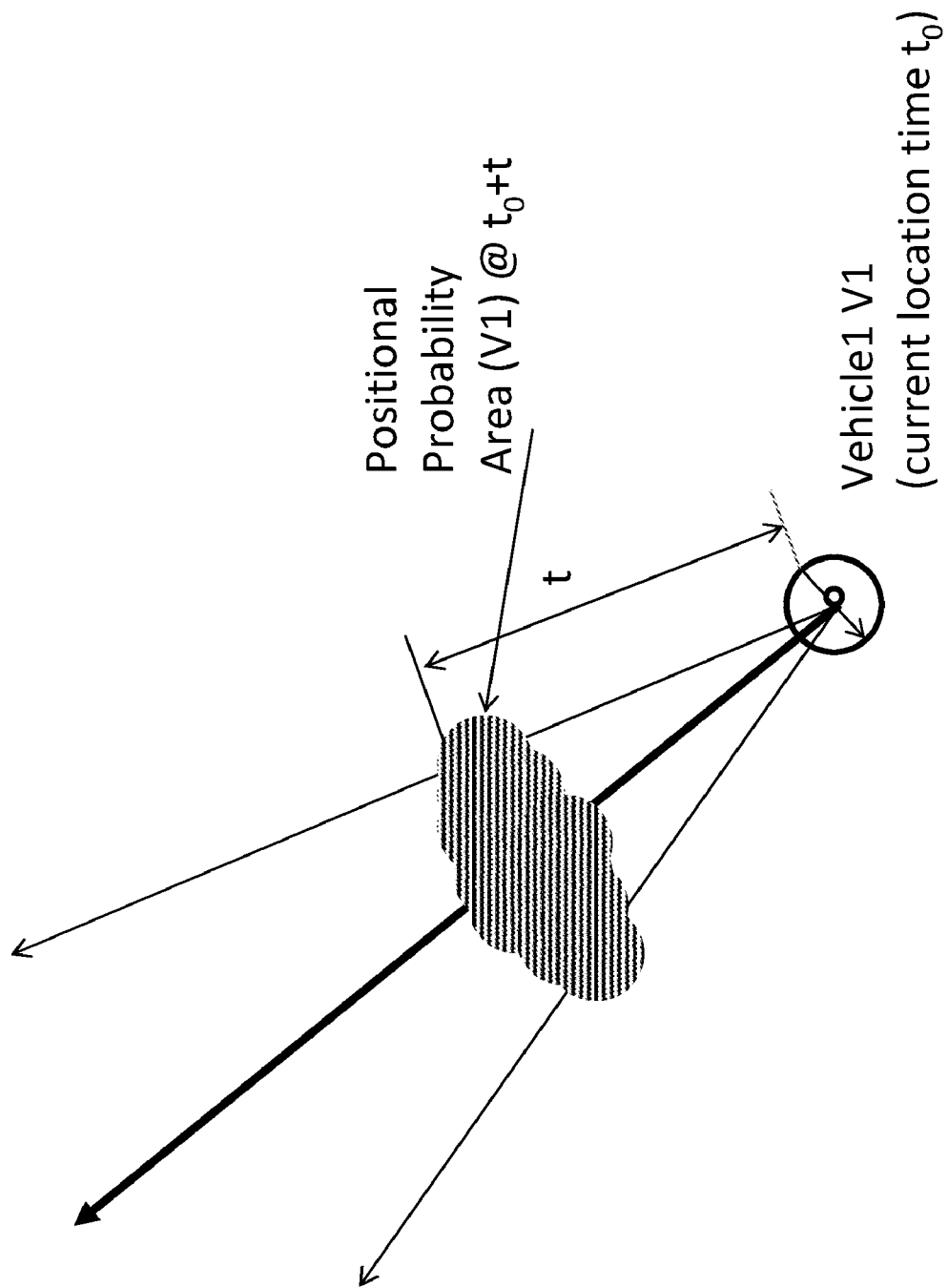
FIG. 17 illustrates a positional probability area for a vehicle.
Figure 18:
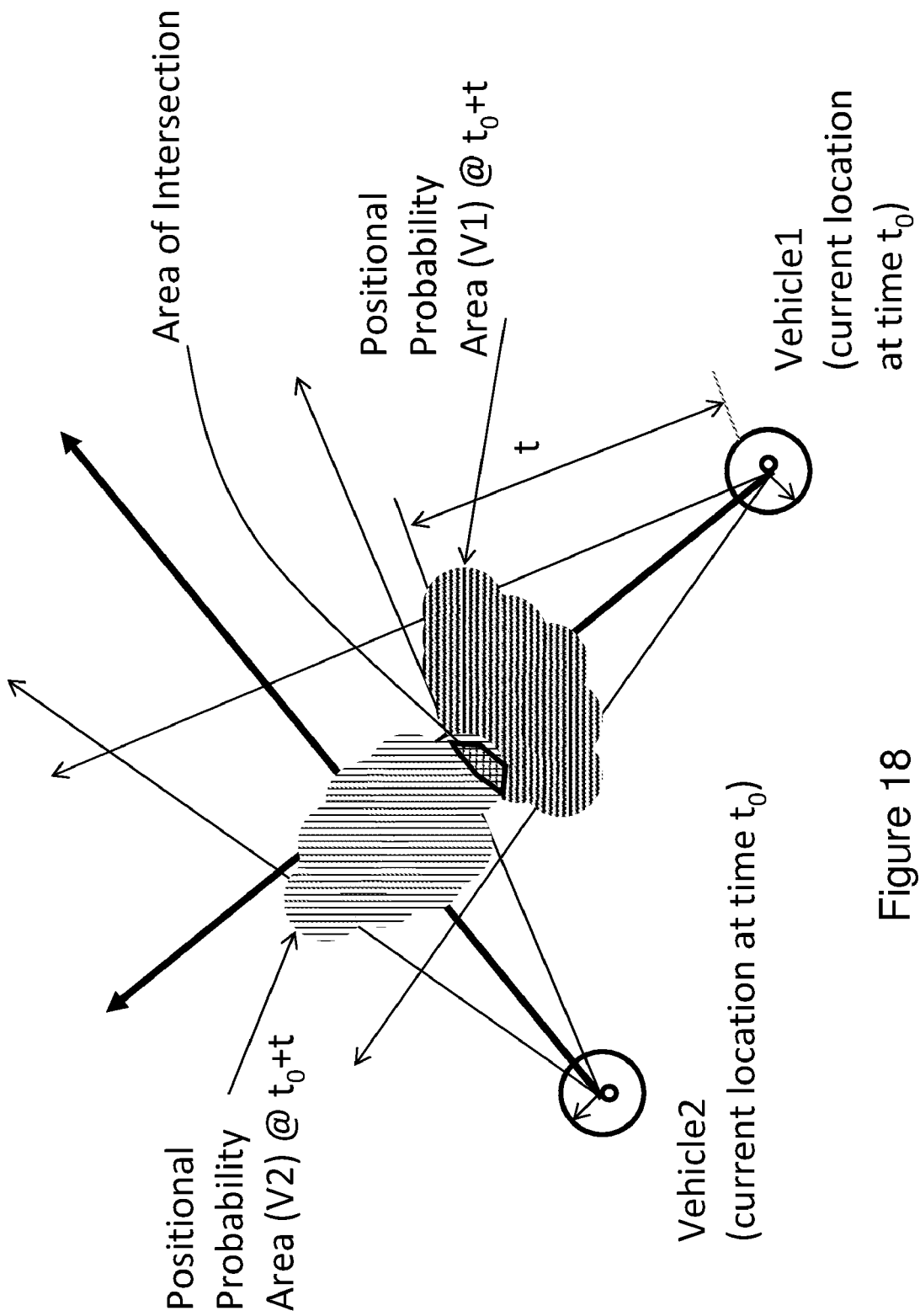
FIG. 18 shows the Area of Intersection of the positional probability areas of vehicles V1 and V2 at time t.

FIG. 17 shows a positional probability area of vehicle V1 at time t. FIG. 18 shows the Area of Intersection of the positional probability areas of vehicles V1 and V2 at time t.

Figure 19:
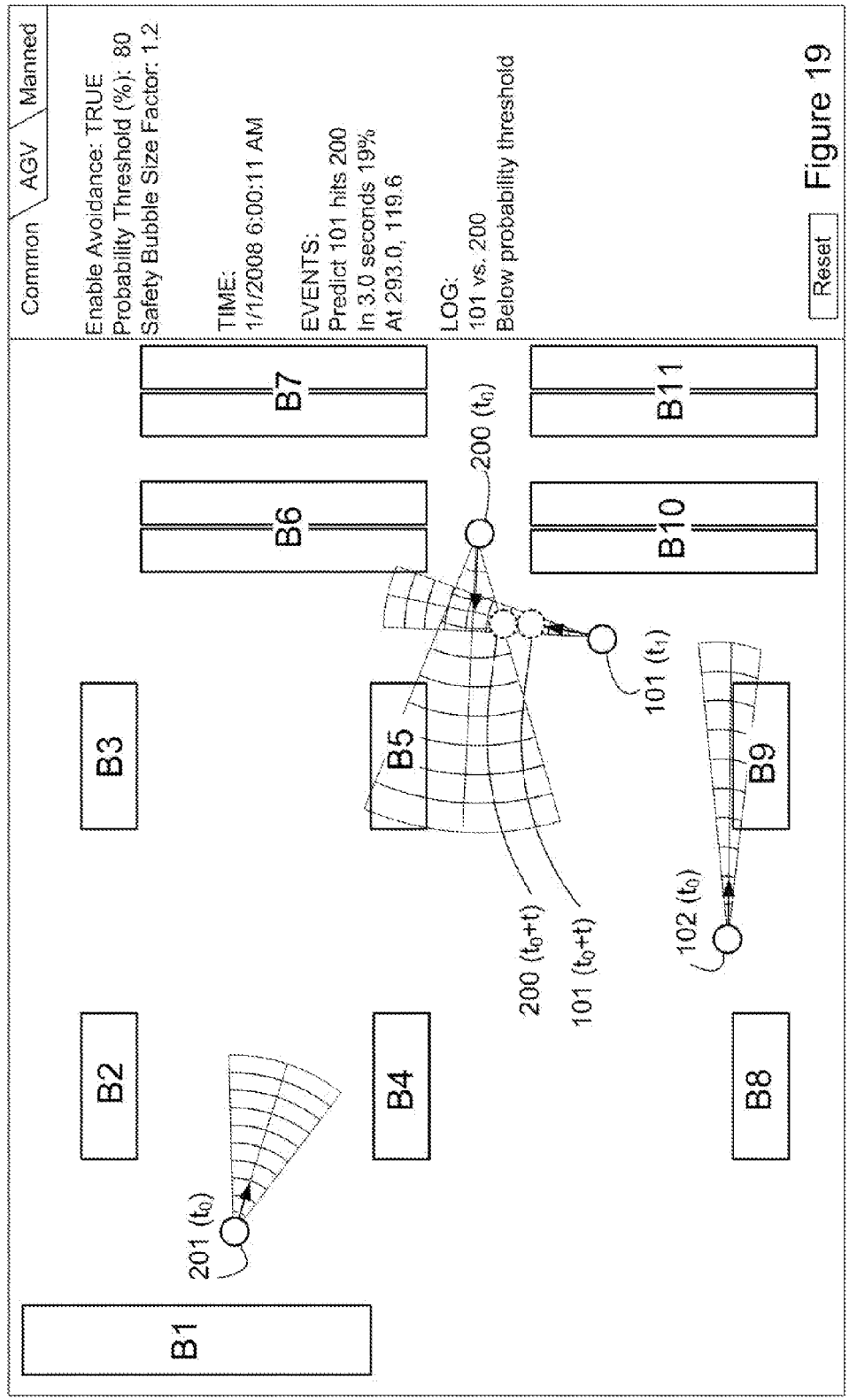
FIG. 19 is a screen shot of a system operator display showing multiple vehicles within an operating environment at a time $t_0$.

FIG. 19 is a screen shot of a system operator display showing multiple vehicles 101, 102, 200, 201 within an operating environment having barriers B1-B11 at a time $t_0$ when a predicted collision between an AGV 101 and a manned vehicle 200 at time $t_0$+t is first predicted but not reported because the probability of collision (18%) is not over a predetermined threshold (80%) (see text box at right).

Figure 20:
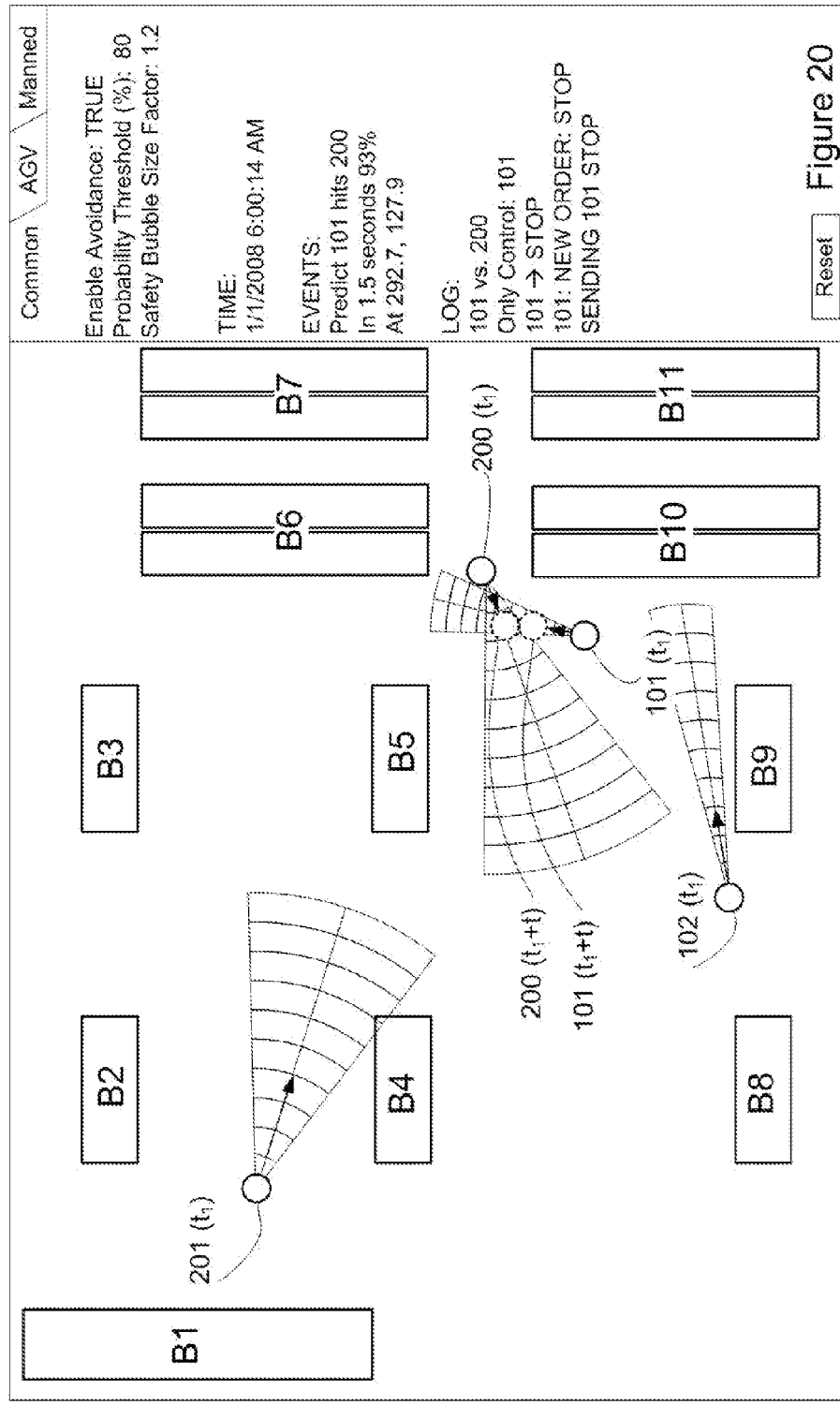
FIG. 20 is a screen shot of a system operator display showing multiple vehicles within an operating environment at a time $t_1$.

FIG. 20 is a screen shot of a system operator display showing the same multiple vehicles 101, 102, 200, 201 within the same operating environment at a time $t_1$ when the predicted collision between the AGV 101 and the manned vehicle 200 at time $t_1$+t has a probability (93%), above the predetermined threshold (80%) (see text box at right), resulting in a command to the AGV server 3 to slow or stop vehicle 101.

Note the adjustable system parameters in top right corner of the text box: The Safety Bubble size factor is a perimeter that is put around a vehicle for display purpose. The Probability Threshold is the percentage of the interesection calculations that determine if a predicted collision will be reported or not. In the example of FIG. 19 the probability of collision of 18% is below the threshold of 80%. In the example of FIG. 20 the probability of collision of 93% is above the threshold of 80%.

The CAS 10 does not consider the following situations for collision prediction:
1. any two vehicles that are considered non-reactive (FIG. 8, block 318).
2. any two vehicles that are both currently stationary (0 velocity) (FIG. 8, block 304).
3. any two vehicles that are further apart than the sum of the distances that each vehicle can travel during the Look Ahead Period. (FIG. 9 and FIG. 8, block 308).

A negative collision prediction is determined by CAS 10 if the following situations occur (otherwise a positive collision prediction is determined):
1. If one vehicle V1 is stationary, and the distance from the current vehicle V1 location to the nearest point within the moving vehicle's V2 trajectory is greater than the Vehicle 1 Buffer Radius (FIG. 10).
2. If one vehicle is stationary, and the time for the moving vehicle to reach the closest point within the vehicle buffer zone of the stationary vehicle is greater than Look Ahead Time t (FIG. 11).
3. If the Area of Intersection is zero, i.e., vehicles V1, V2 are not on approach courses (FIG. 6).
4. If the entire Area of Intersection is within non-reactive zone(s) to either vehicle or outside all zones (FIGS. 12 and 13, FIG. 8, block 318).
5. If the Area of Intersection is below a threshold value, i.e., the probability of collision is low (FIGS. 16, 18 and FIG. 8, block 322).

6. If the time $t_1$ for vehicle 1's Buffer Radius to touch the closest point within the Area of Intersection is greater than Look Ahead Period (FIG. 14)

7. If at time $t_1$, vehicle V2 has not entered or has completely passed the Intersection Area (FIG. 14).

The present invention is also directed to an apparatus for avoiding collisions between vehicles, the apparatus comprising a computing device having a central processing unit (CPU), a memory for storing operating instructions and data related to manned and unmanned vehicles, a communications interface and an operator console (see FIG. 2).

As shown in FIG. 8 the apparatus communicates with at least one server (FIG. 1A or 1B) that utilizes a position and rotational orientation system (FIG. 2) to track the location of the vehicles within a preconfigured operational zone to receive vehicle location data at predetermined time intervals. The apparatus calculates the current predicted trajectory and safety zone of each manned vehicle to determine any areas of intersection with other manned or unmanned vehicles. The apparatus calculates a probability of collision of each manned vehicle with other manned or unmanned vehicles and compares each probability of collision with a predetermined threshold.

The apparatus communicates predicted collisions with a probability above the threshold to the at least one server 2,3 (FIG. 1A or 1B), the server 2,3 issuing a command or a warning to the vehicles predicted to collide.

Those skilled in the art, having benefit of the teachings of the present invention asset forth herein, may effect modifications thereto. Such modifications are to be construed as lying within the contemplation of the present invention, as defined by the appended claims.

We claim:

1. A method for avoiding collisions between manned vehicles and other manned vehicles or between manned vehicles and automatically guided vehicles within a defined operational environment, the method comprising:
    a) receiving, by a server, information on the position and orientation of each vehicle within the defined operational environment at predetermined time intervals from an optical position and rotational orientation system;
    b) determining, by a collision avoidance apparatus configured to communicate with the server, a predicted trajectory and a safety zone for each vehicle by calculating the velocity and direction of travel of each vehicle from the position and orientation information at successive time intervals;
    c) determining, by the collision avoidance apparatus, any areas of intersection of the safety zone of a manned vehicle with the safety zones of other manned or automatically guided vehicles to predict a potential collision;
    d) transmitting instructions by the collision avoidance apparatus to the server to an automatically guided vehicle whose predicted safety zone lies within an area of intersection of the safety zone of another vehicles to reduce the speed or to stop the automatically guided vehicle to prevent the predicted collision, the automatically guided vehicle reducing its speed or stopping in response to the instructions; and
    e) transmitting a warning by the collision avoidance apparatus to the server to one or more manned vehicles whose predicted safety zone(s) lies within an area of intersection of the safety zone of another vehicle to cause a driver interface of the one or more manned vehicles to alert the one or more drivers of a predicted potential collision, so that the one or more drivers can take appropriate action to avoid the predicted collision.

2. The method of claim 1 wherein the steps a) through c) are repeated and if no areas of intersection of the safety zones between a manned and an automatically guided vehicle are subsequently determined then
    transmitting instructions by the collision avoidance apparatus to the server to an automatically guided vehicle previously slowed or stopped to resume its previous velocity, the automatically guided vehicle resuming its previous velocity in response to the instructions;
    and if no areas of intersection of the safety zones between a manned and another manned vehicle are subsequently determined, then
    transmitting a signal by the collision avoidance apparatus to the server canceling the alarm to the one or more manned vehicles to cause the driver interface of the one or more manned vehicles to alert the one or more drivers that no potential collision is predicted so that the one or more drivers can take appropriate action.

3. The method of claim 1 wherein the defined operational environment is divided into operational zones that define areas within which the vehicles operate and barrier zones that define fixed obstacles within the defined operational environment, the method further comprising in step c):
    the collision avoidance apparatus determining from the predicted trajectory and safety zones of the vehicles if a barrier zone masks any areas of intersection of the safety zone of a manned vehicle or an automatically guided vehicle with the other safety zone of the manned or automatically guided vehicles, and thus not predicting a potential collision.

4. The method of claim 1 further comprising, before step b), assigning predetermined probability factors to account for operational capabilities of each vehicle, thus establishing an uncertainty band for the predicted trajectory and safety zone for each vehicle.

5. A collision avoidance apparatus for avoiding collisions between vehicles, the apparatus comprising a computing device having a central processing unit, a memory for storing operating instructions and data related to manned and automatically guided vehicles, a communications interface and an operator console;
    the apparatus communicating with at least one server that utilizes an optical position and rotational orientation system to track the location and rotational orientation of the vehicles within a preconfigured operational zone by receiving vehicle location and rotational orientation data at predetermined time intervals from the at least one server;
    the apparatus calculating the current predicted trajectory and safety zone of each manned vehicle and each automatically guided vehicle at each predetermined time interval to determine any areas of intersection of safety zones of other manned or automatically guided vehicles;
    the apparatus calculating a probability of collision of each manned vehicle and each automatically guided vehicle with other manned or automatically guided vehicles;
    the apparatus comparing each probability of collision with a predetermined threshold;
    the apparatus communicating each predicted collision with a probability above the threshold to the at least one server, the server issuing a command or a warning to the vehicles predicted to collide, the warned vehicles able to take appropriate action to avoid collision.

6. The apparatus of claim 5 wherein, after the warned vehicles take appropriate action to avoid collision:
    the collision avoidance apparatus continuing to track the vehicles and continuing to determine any areas of intersection of safety zones, and if no areas of intersection of the safety zones between a manned and an automatically guided vehicle are subsequently determined, then the collision avoidance apparatus transmitting instructions to the at least one server to an automatically guided vehicle previously slowed or stopped to resume its previous velocity, the automatically guided vehicle resuming travel in response to the instructions;

and if no areas of intersection of the safety zones between a manned and another manned vehicle are subsequently determined, then the collision avoidance apparatus transmitting a signal to the at least one server to the one or more manned vehicles canceling the alarm to cause a driver interface of the one or more manned vehicles to alert the one or more drivers that no potential collision is predicted so that the one or more drivers can take appropriate action.

7. A method for avoiding collisions between manned vehicles and other manned vehicles or between manned vehicles and automatically guided vehicles within a defined operational environment, the method being implemented by a collision avoidance system that communicates with a manned vehicle server and with an automatically guided vehicle server, each server having an associated optical position and rotational orientation system, each manned vehicle having a driver interface, the method comprising:

a) optically determining the position and orientation of each vehicle within the defined operational environment relative to one or more of a plurality of position markers in known locations at predetermined time intervals;

b) the collision avoidance system receiving information from the associated optical position and rotational orientation systems on the position and orientation of each vehicle within the defined operational environment at the predetermined time intervals;

c) the collision avoidance system determining a predicted trajectory and a predicted safety zone for each vehicle by calculating a velocity and a direction of travel of each vehicle from the position and orientation information at successive time intervals;

d) the collision avoidance system determining any areas of intersection of the safety zone of a manned vehicle with the safety zones of other manned or automatically guided vehicles to predict a potential collision;

e) the collision avoidance system transmitting instructions to the automatically guided vehicle server to any automatically guided vehicle whose predicted safety zone falls within an area of intersection of safety zones to reduce the speed or to stop the automatically guided vehicle to prevent the predicted collision, the automatically guided vehicle reducing its speed or stopping in response to the instructions; and f) the collision avoidance system transmitting a warning to the manned vehicle server to one or more manned vehicles whose predicted safety zone falls within an area of intersection to cause the one or more driver interfaces to alert the one or more drivers of a predicted potential collision, so that the one or more drivers can take appropriate action to avoid the predicted collision.

8. The method of claim 7 wherein the steps a) through d) are repeated and if no areas of intersection between the safety zone of a manned vehicle and the safety zone of an automatically guided vehicle are subsequently determined, then the collision avoidance system transmitting instructions to the automatically guided vehicle server to any automatically guided vehicle previously slowed or stopped to resume its previous velocity, the automatically guided vehicle resuming its previous velocity in response to the instructions;

and if no areas of intersection between a manned and another manned vehicle are subsequently determined, then transmitting a signal canceling the alarm to the manned vehicle server to the one or more manned vehicles to cause the one or more driver interfaces to alert the one or more drivers that no potential collision is predicted, so that the one or more drivers can take appropriate action.

9. The method of claim 4 wherein determining a predicted trajectory and a safety zone is performed by:

choosing a look ahead period t1, the time period t1 used for prediction analysis;

choosing a probability threshold for reporting a predicted collision;

calculating a trajectory for each vehicle based upon a current direction of travel, a current orientation, and a speed of the vehicle to predict the vehicle's position at time t1;

using an uncertainty band for the calculated trajectory, calculating a positional probability area of each vehicle at time t1;

calculating an area of intersection between the positional probability areas of pairs of safety zones of non-stationary vehicles V1 and V2;

comparing the area of intersection of the positional probability areas with the reporting threshold;

if the positional probability exceeds the reporting threshold, determining if the area of intersection lies beyond a barrier zone;

if the area of intersection of the positional probability areas lies beyond a barrier, canceling the predicted collision;

if the area of intersection of the positional probability areas does not lie beyond a barrier, transmitting a warning of the predicted collision to each vehicle, the warned vehicles able to take appropriate action to avoid collision.

10. A method, performed by a collision avoidance apparatus, for avoiding collisions between manned vehicles and other manned vehicles or between manned vehicles and automatically guided vehicles within a defined operational environment, the manned vehicles and the automatically guided vehicles each being equipped with an optical position and rotational orientation system for optically determining the position and orientation of each vehicle within the defined environment relative to position markers in known locations at predetermined time intervals, each optical position and rotational orientation system being in communication with a server, the method comprising:

a) the optical position and rotational orientation system on each vehicle transmitting information on the position and rotational orientation of each vehicle within the defined operational environment at predetermined time intervals to the server;

b) the server transmitting the position and rotational orientation information to the collision avoidance apparatus;

c) the collision avoidance apparatus assigning predetermined probability factors to account for operational capabilities of each vehicle, thus establishing an uncertainty band for the predicted trajectory and safety zone for each vehicle;

d) the collision avoidance apparatus determining a predicted trajectory and a safety zone for each vehicle by calculating a velocity and direction of travel of each vehicle from the position and rotational orientation information at successive time intervals;

e) the collision avoidance apparatus determining any areas of intersection of the safety zone of a manned vehicle with the safety zone of other manned or automatically guided vehicles to predict a potential collision by:
  i) choosing a look ahead period t1, the time period t1 used for prediction analysis;
  ii) choosing a probability threshold for reporting a predicted collision;
  iii) calculating a trajectory for each vehicle based upon a current direction of travel, a current orientation, and a speed of the vehicle to predict the vehicle's position at time t1;
  iv) using the uncertainty band for the predicted trajectory, calculating a positional probability area of each vehicle at time t1;
  v) calculating an area of intersection between the positional probability areas of pairs of safety zones of non-stationary vehicles;
  vi) comparing the area of intersection of the positional probability areas with the reporting threshold;
  vii) if the probability exceeds the threshold, determining if the area of intersection lies beyond a barrier;
  viii) if the area of intersection of the positional probability areas lies beyond a barrier, generating a negative prediction of collision;
  ix) if the area of intersection of the positional probability areas does not lie beyond a barrier, generating a positive prediction of collision;
f) the collision avoidance apparatus transmitting instructions to the server to an automatically guided vehicle within an area of intersection of the safety zones to reduce the speed or to stop the automatically guided vehicle to prevent the predicted collision, the automatically guided vehicle reducing its speed or stopping in response to the instructions;
g) the collision avoidance apparatus transmitting a warning to the server to one or more manned vehicles to cause the driver interface to alert the one or more drivers of a predicted collision, so that the one or more drivers can take appropriate action to avoid the predicted collision.

* * * * *